(12) United States Patent
Liang et al.

(10) Patent No.: US 8,597,838 B2
(45) Date of Patent: Dec. 3, 2013

(54) LITHIUM SULFIDE COMPOSITIONS FOR BATTERY ELECTROLYTE AND BATTERY ELECTRODE COATINGS

(75) Inventors: Chengdu Liang, Knoxville, TN (US); Zengcai Liu, Oak Ridge, TN (US); Wunjun Fu, Oak Ridge, TN (US); Zhan Lin, Knoxville, TN (US); Nancy J. Dudney, Knoxville, TN (US); Jane Y. Howe, Oak Ridge, TN (US); Adam J. Rondinone, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 13/463,451

(22) Filed: May 3, 2012

(65) Prior Publication Data

US 2013/0295469 A1 Nov. 7, 2013

(51) Int. Cl.
*H01M 6/16* (2006.01)
(52) U.S. Cl.
USPC ........................................ 429/335; 429/188
(58) Field of Classification Search
USPC ........................................................ 429/335
See application file for complete search history.

(56) References Cited

U.S. PATENT DOCUMENTS

| | | | |
|---|---|---|---|
| 4,410,609 A | 10/1983 | Peled et al. | |
| 5,686,201 A | 11/1997 | Chu | |
| 6,017,651 A | 1/2000 | Nimon et al. | |
| 6,025,094 A | 2/2000 | Visco et al. | |
| 6,030,720 A | 2/2000 | Chu et al. | |
| 6,225,002 B1 | 5/2001 | Nimon et al. | |
| 7,358,012 B2 | 4/2008 | Mikhaylik | |
| 2011/0318651 A1* | 12/2011 | Leitner et al. | 429/320 |
| 2012/0196186 A1* | 8/2012 | Richard | 429/231.6 |

OTHER PUBLICATIONS

Cheon, S., et al., "Rechargeable Lithium Sulfur Battery", Journal of the Electrochemical Society, May 2003, vol. 150, Issue 6, pp. A800-A805.
Choi, M., et al., "Mesoporous carbons with KOH activated framework and their hydrogen adsorption", Journal of Materials Chemistry, Aug. 2007, pp. 4204-4209.
Dean, J. A., "Lange's Handbook of Chemistry", McGraw-Hill Handbooks, Oct. 1998.
Gorka, J., et al., "KOH activation of mesoporous carbons obtained by soft-templating", Carbon, Jul. 2008, Volume: 46, Issue: 8, pp. 1159-1174.
He, X., et al., "In situ composite of nano SiO2-P(VDF-HFP) porous polymer electrolytes for Li-ion batteries", Electrochimica Acta, Nov. 2005, vol. 51, No. 6, pp. 1069-1075.
Jeon, B. H., et al., "Preparation and electrical properties of lithium-sulfur-composite polymer batteries", Journal of Materials Processing Technology, Dec. 2003, vols. 143-144, pp. 93-97.

(Continued)

*Primary Examiner* — Barbara Gilliam
*Assistant Examiner* — Gary Harris
(74) *Attorney, Agent, or Firm* — Scully, Scott, Murphy & Presser, P.C.

(57) ABSTRACT

Method of forming lithium-containing electrolytes are provided using wet chemical synthesis. In some examples, the lithium containing electrolytes are composed of $\beta$-$Li_3PS_4$ or $Li_4P_2S_7$. The solid electrolyte may be a core shell material. In one embodiment, the core shell material includes a core of lithium sulfide ($Li_2S$), a first shell of $\beta$-$Li_3PS_4$ or $Li_4P_2S_7$, and a second shell including one of $\beta$-$Li_3PS_4$ or $Li_4P_2S_7$ and carbon. The lithium containing electrolytes may be incorporated into wet cell batteries or solid state batteries.

9 Claims, 11 Drawing Sheets

(56) References Cited

OTHER PUBLICATIONS

Liang, C., et al., "Synthesis of a Large-Scale Highly Ordered Porous Carbon Film by Self-Assembly of Block Copolymers", Angewandte Chemie, Nov. 2004, vol. 43, Issue 43, pp. 5785-5789.

Liang, C., et al., "Synthesis of Mesoporous Carbon Materials via Enhanced Hydrogen-Bonding Interaction", Journal of the American Chemical Society, Apr. 2006, vol. 128, Issue: 16, pp. 5316-5317.

Mikhaylik, Y. V., et al., "Polysulfide Shuttle Study in the Li/S Battery System", Journal of the Electrochemical Society, Oct. 2004, vol. 151, Issue 11, pp. A1969-A1976.

Peled, E, et al., "Lithium-Sulfur Battery: Evaluation of Dioxolane-Based Electrolytes", Journal of the Electrochemical Society, Jun. 1989, vol. 136, No. 6.

Ryu, H., et al., "The Electrochemical Properties of Poly(acrylonitrile) Polymer Electrolyte for Li/S Battery", Materials Science Forum, Mar. 2006, vol. 510-511, pp. 50-53.

Ryu, H., et al., "Discharge process of Li/PVdF/S cells at room temperature", Journal of Power Sources, Feb. 2006, vol. 153 Issue 2, pp. 360-364.

Shin, J.H., "Preparation and characterization of plasticized polymer electrolytes based on the PVdF-HFP copolymer for lithium/sulfur battery", Journal or Materials Science: Materials in Electronics, Dec. 2002, vol. 13, Issue 12, pp. 727-733.

Steudel, R., "Inorganic Polysulfides $Sn2-$ and Radical Anions $Sn-$", Top Curr Chem, 2003, vol. 35, Issue 3.

Steudel, R., "The Chemistry of Organic Polysulfanes $R-S_n-R(n>2)$", Chem. Rev., Jan. 2003, pp. 3905-3945.

Wang X., et al., "Facile Synthesis of Ordered Mesoporous Carbons with High Thermal Stability by Self-Assembly of Resorcinol-Formaldehyde and Block Copolymers under Highly Acidic Conditions", Langmuir, Jul. 2008, vol. 24, pp. 7500-7505.

Wang, J., et al., "Sulfur-mesoporous carbon composites in conjunction with a novel ionic liquid electrolyte for lithium rechargeable batteries", Carbon, Jan. 2008, vol. 46, pp. 229-235.

Wang, J. L., et al., "Sulfur-carbon nano-composite as cathode for rechargeable lithium battery based on gel electrolyte", Electrochemistry Communications, Jun. 2002, vol. 4, pp. 499-502.

Dominey, L. A., "Current State of the Art on Lithium Battery Electrolytes", Industrial Chemistry Library, 1994, Chapter 4, pp. 137-165.

* cited by examiner

LITHIUM SULFIDE COMPOSITIONS FOR BATTERY ELECTROLYTE AND BATTERY ELECTRODE COATINGS

STATEMENT REGARDING FEDERALLY SPONSORED RESEARCH OR DEVELOPMENT

This invention was made with government support under Contract Number DE-AC05-00OR22725 between the United States Department of Energy and UT-Battelle, LLC. The U.S. government has certain rights in this invention.

FIELD OF THE INVENTION

The present disclosure relates to materials for battery applications, such as solid state batteries and batteries including liquid electrolytes.

BACKGROUND

Lithium-ion batteries have found widespread usage as electrical energy storage devices in various portable electronics because of their light weight relative to other types of batteries. However, for high power applications such as electric vehicles, there has been a continuing effort to improve the energy output and useful lifetime in lithium ion batteries to better suit these high power applications. Lithium-sulfur (Li/S) batteries, in particular, hold great promise for high power applications. Lithium-sulfur batteries have a theoretical capacity of 1675 mAhg$^{-1}$, nearly one magnitude higher than that of LiFePO$_4$ (theoretical capacity of 176 mAhg$^{-1}$). Nevertheless, the Li/S system has not yet been implemented in high power applications, because of two significant obstacles, the poor electrical conductivity of elemental sulfur and the intrinsic polysulfide shuttle.

SUMMARY

In one aspect, the present disclosure provides a method of forming a composite core shell material including lithium (Li). In one embodiment, the method of forming the composite core shell material includes forming a first mixture including a solid component of a first portion of lithium sulfide (Li$_2$S) and diphosphorus pentasulfide (P$_2$S$_5$) in a ratio ranging from 0.75:1 to 1.25:1 with a liquid solvent comprising carbon and hydrogen to form a first shell on a core material of the composite core shell material. The core of the composite core shell material may be comprised of lithium sulfide (Li$_2$S) and the first shell of the composite core shell material may be comprised of Li$_4$P$_2$S$_7$. A second mixture of a second portion of lithium sulfide (Li$_2$S) and a carbon (C) powder may then be formed. The second mixture may be combined with the first mixture after the first shell of the composite core shell material is formed. Combining the first mixture with the second mixture provides at least one second shell that is comprised of Li$_4$P$_2$S$_7$ and carbon (C), wherein the at least one second shell is in contact with the first shell. The liquid solvent may then be removed.

In another aspect, a composite core shell material is provided that in one embodiment includes a lithium sulfide core having a longest axis ranging from 1 micron to 100 microns, and a first shell comprised of Li$_4$P$_2$S$_7$. The first shell is in direct contact with an exterior surface of the lithium sulfide core and encapsulates the lithium sulfide core. The first shell may have a thickness that ranges from 1 nm to 100 nm. The composite core shell material may also include at least one second shell comprised of lithium sulfide and carbon. The second shell of the composite core shell material may be in direct contact with an exterior surface of the first. The at least one second shell may have a thickness ranging from 1 nm to 100 nm.

In yet another aspect, the present disclosure provides a wet cell battery. In one embodiment, the wet cell battery may include a negative electrode of lithium (Li), an ether based electrolyte, and a positive electrode comprising a conductive substrate coated with a composite core shell material. The composite core shell material may include a lithium sulfide core, a first shell comprised of Li$_4$P$_2$S$_7$ in direct contact with an exterior surface of the lithium sulfide core and encapsulating the lithium sulfide core, and at least one second shell comprised of Li$_4$P$_2$S$_7$ and carbon (C) in direct contact with an exterior surface of the first shell.

In a further aspect, the present disclosure provides a method of reducing polysulfide shuttle in a lithium sulfur (Li—S) battery. In one embodiment, the method may include positioning a negative electrode comprised of lithium (Li) within a wet cell of an ether based electrolyte. A positive electrode may then be formed comprising a coating of a composite core shell material. The core of the composite core shell material may be composed of lithium sulfide (Li$_2$S), and the shell of the composite core shell material is a solid electrolyte. The solid electrolyte may include a diffusion barrier layer to polysulfides that is comprised of Li$_4$P$_2$S$_7$, which encapsulates the core of lithium sulfide (Li$_2$S). The solid electrolyte may further include a conductive layer that is comprised of at least Li$_4$P$_2$S$_7$ and carbon (C). The conductive layer of the solid electrolyte is present on the diffusion barrier layer. The positive electrode may be positioned in the wet cell and is separated from the negative electrode.

In another aspect of the present disclosure, a method of forming a solid electrolyte material is provided. In one embodiment, the method of forming the solid electrolyte material may include mixing lithium sulfide (Li$_2$S) and diphosphorus pentasulfide (P$_2$S$_5$) in a ratio ranging from 2.75:1 to 3.25:1 with a liquid solvent comprising tetrahydrofuran (THF) to form a precipitate of Li$_3$PS$_4$. The precipitate of Li$_3$PS$_4$ may then be heated to provide at least one phase change to a recrystallized β-Li$_3$PS$_4$. The recrystallized β-Li$_3$PS$_4$ has a crystallite size of 500 nm or less.

In yet another aspect, a solid electrolyte material is provided that in one embodiment includes β-Li$_3$PS$_4$ having a crystallite size of 100 nm or less. The β-Li$_3$PS$_4$ may be a micro-strained structure characterized by a lattice strain ranging from 0.01% to 10%. The β-Li$_3$PS$_4$ may further be a porous structure that is characterized by a surface area that ranges from 10 m$^2$g$^{-1}$ to 20 m$^2$g$^{-1}$. The β-Li$_3$PS$_4$ may have an ionic conductivity ranging from 1.5×10$^{-4}$ Scm$^{-1}$ to 3.5×10$^{-4}$ Scm$^{-1}$.

In a further aspect of the present disclosure, a solid state battery is provided that includes a negative electrode comprised of lithium, a positive electrode comprised of platinum, and a solid electrolyte of β-Li$_3$PS$_4$. The solid electrolyte of β-Li$_3$PS$_4$ may have a particle size of 100 nm or less, wherein the β-Li$_3$PS$_4$ is a micro-strained and a porous structure. The micro-strained structure may be characterized by a lattice strain ranging from 0.01% to 10%. The porous structure may be characterized by a surface area that ranges from 10 m$^2$g$^{-1}$ to 20 m$^2$g$^{-1}$. In one embodiment, the β-Li$_3$PS$_4$ that provides the solid electrolyte of the solid state battery has an ionic conductivity ranging from 1.5×10$^{-4}$ Scm$^{-1}$ to 3.5×10$^{-4}$ Scm$^{-1}$.

In another aspect, a method of forming a composite core shell material is provided that includes shells composed of β-Li$_3$PS$_4$. The method may include providing a first mixture including a solid component of a first portion of lithium sulfide ($Li_2S$) and diphosphorus pentasulfide ($P_2S_5$) in a ratio ranging from 2.75:1 to 3.25:1 with a liquid solvent comprising carbon and hydrogen to form a first shell of the composite core shell material. The core of the composite core shell material is comprised of lithium sulfide ($Li_2S$) and the first shell of the composite core shell material is comprised of $Li_3PS_4$. A second mixture is formed of a second portion of lithium sulfide and carbon powder. The second mixture is combined with the first mixture after the first shell of the composite core shell material is formed. The combining of the first mixture with the second mixture provides at least one second shell that is comprised of $Li_3PS_4$ and carbon (C), wherein the at least one second shell is in contact with the first shell. The solvent is then removed. Removing the solvent from the $Li_3PS_4$ may produce at least one phase change to a recrystallized $\beta$-$Li_3PS_4$.

In yet another aspect, a composite core shell material is provided having at least one shell with a composition that includes $\beta$-$Li_3PS_4$. In one embodiment, the composite core shell material includes a lithium sulfide ($Li_2S$) core having a longest axis ranging from 0.01 micron to 100 microns. A first shell of the composite core shell material that is comprised of $\beta$-$Li_3PS_4$ is in direct contact with an exterior surface of the lithium sulfide core ($Li_2S$) and encapsulates the lithium sulfide core ($Li_2S$). The first shell may have a thickness ranging from 1 nm to 100 nm. At least one second shell comprised of $\beta$-$Li_3PS_4$ and carbon (C) is present in direct contact with an exterior surface of the first shell. Each of at least one second shell may have a thickness that ranges from 1 nm to 100 nm.

In a further aspect, a wet cell battery is provided that includes a positive electrode including a composite core shell material, in which at least one shell has a composition that includes $\beta$-$Li_3PS_4$. In one embodiment, the wet cell battery includes an ether based electrolyte, a negative electrode present in the ether based electrolyte, and a positive electrode present in the ether based electrolyte separated from the negative electrode. The positive electrode may include a conductive substrate coated with a composite core shell material. The composite core shell material includes a lithium sulfide core, a first shell comprised of $\beta$-$Li_3PS_4$ in direct contact with an exterior surface of the lithium sulfide core and encapsulating the lithium sulfide core, and at least one second shell comprised of $Li_3PS_4$ and carbon (C) in direct contact with an exterior surface of the first shell.

BRIEF DESCRIPTION OF THE DRAWINGS

The following detailed description, given by way of example and not intended to limit the disclosure solely thereto, will best be appreciated in conjunction with the accompanying drawings, wherein like reference numerals denote like elements and parts, in which.

DETAILED DESCRIPTION

Detailed embodiments of the present disclosure are described herein; however, it is to be understood that the disclosed embodiments are merely illustrative of the compositions, structures and methods of the disclosure that may be embodied in various forms. In addition, each of the examples given in connection with the various embodiments are intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the compositions, structures and methods disclosed herein. References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Figure 1:
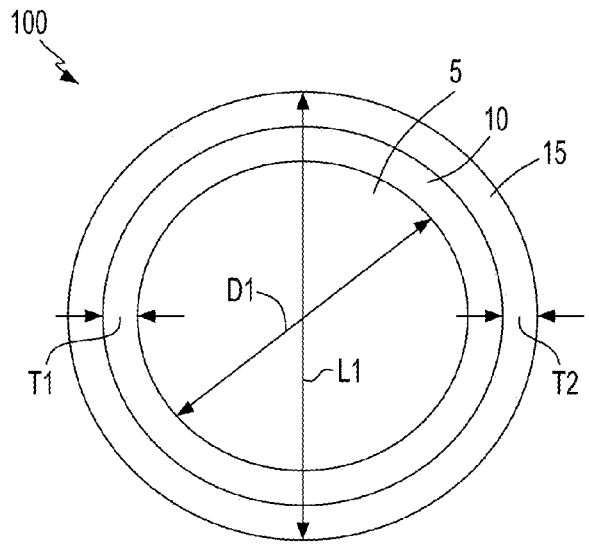
FIG. 1 is a side cross-sectional view of one embodiment of a composite core shell material, wherein the composition of at least one shell includes $Li_4P_2S_7$, in accordance with the present disclosure.

FIG. 1 depicts one embodiment of a method of forming a composite core shell material 100 including lithium. A "core shell material" is a material with a core of a first material that has a different composition than a shell material, i.e., second material, which is positioned on an exterior surface of the core. The term "composite" as used herein denotes that the core shell material includes two or more constituent materials having different physical and/or chemical properties that remain separate and distinct within the finished structure. In some embodiments, the composite core shell material 100 comprises a core 5 composed of lithium sulfide ($Li_2S$), a first shell 10 of $Li_4P_2S_7$ that is in direct contact and encapsulating the core 5 of lithium sulfide, and at least a second shell 15 of $Li_4P_2S_7$ and carbon, in which the second shell 15 is in direct contact with and encapsulates the first shell 10. The second shell 15 may encapsulate the first shell 10. In some embodiments, the second shell 15 is present on only a portion of the first shell 10, i.e., the second shell 15 does not encapsulate the first shell 10.

In some embodiments, the composite core shell material 100 disclosed herein is suitable for a solid electrolyte that may be employed as a coating on the electrode of a wet cell battery, such as a lithium-sulfide battery (LiS). Lithium-ion battery (sometimes Li-ion battery or LIB) is a family of rechargeable battery types in which lithium ions move from the negative electrode to the positive electrode during discharge, and back when charging. Lithium-sulfur (Li—S) batteries can suffer from poor ionic and electronic conductivity for the sulfur containing components of the battery, e.g., sulfur containing electrodes, and their discharging byproducts. For example, the electrical conductivity of elemental sulfur is as low as $5 \times 10^{-30}$ S/cm at 25° C. Such a low conductivity causes poor electrochemical contact to the sulfur containing components of the battery and leads to low utilization of active materials in the positive electrode, e.g., cathode.

To compensate for the poor ionic and electronic conductivity for the sulfur containing electrodes, a liquid electrolyte is conventionally employed, which has a high solubility of lithium polysulfides and sulfide. The utilization of sulfur in batteries containing liquid electrolyte depends on the solubility of these sulfur species in the liquid electrolyte. Further, the sulfur in the positive electrode, e.g., cathode, except at the full charge state, is generally present as a solution of polysulfides in the electrolyte. The concentration of polysulfide species $S_n^{2-}$ with n greater than 4 at the positive electrode is generally higher than that at the negative electrode, e.g., anode, and the concentration of $S_n^{2-}$ with n smaller than 4 is generally higher at the negative electrode than the positive electrode. The concentration gradients of the polysulfide species drive the intrinsic polysulfide shuttle between the electrodes. Polysulfide shuttle transports sulfur species back and forth between the two electrodes, in which the sulfur species may be migrating within the battery all the time. Polysulfide shuttle leads to poor cyclability, high current leakage, and low charge-discharge efficiency. Further, a portion of the polysulfide is transformed into lithium sulfide ($Li_2S$), which is deposited on the negative electrode. The deposited polysulfide may cause a "chemical short" of the battery. The "chemical short" leads to the loss of active materials, corrosion of the lithium containing negative electrode, i.e., anode, and a low columbic efficiency. Further, the mobile sulfur species causes the redistribution of sulfur in the battery and imposes a poor cycle-life for the battery, in which the poor cycle life directly relates to micro-structural changes of the electrodes. This deposition process occurs in each charge/discharge cycle, and eventually leads to the complete loss of capacity of the sulfur positive electrode. The deposition of lithium sulfide also leads to an increase of internal cell resistance within the battery due to the insulating nature of lithium sulfide. Progressive increases in charging voltage and decreases in discharge voltage are common phenomena in lithium-sulfur (Li—S) batteries, because of the increase of cell resistance in consecutive cycles. Hence, the energy efficiency decreases with the increase of cycle number.

Figure 2:
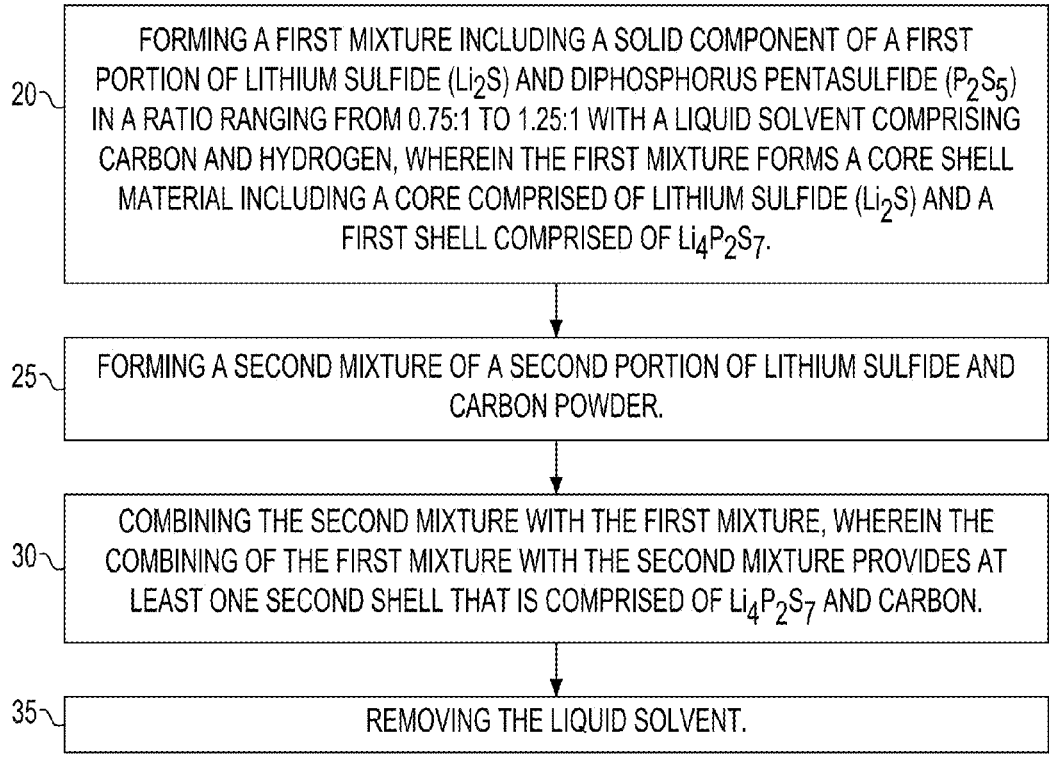
FIG. 2 is a flow chart of one embodiment of a method of forming a composite core shell material having at least one shell including $Li_4P_2S_7$, in accordance with the present disclosure.

In some embodiments, the composite core shell material 100 that is provided herein increases the ionic conductivity of the sulfur-containing positive electrode of wet cell lithium sulfur (Li—S) batteries by employing a lithium sulfide ($Li_2S$) and diphosphorus pentasulfide ($P_2S_5$) based solid electrolyte. Referring to FIGS. 1 and 2, in one embodiment a wet synthesis method has been provided in which lithium sulfide ($Li_2S$) and diphosphorus pentasulfide ($P_2S_5$) are mixed in an organic solvent at room temperature, e.g., between 20° C. and 25° C., to form a composite core shell material 100 including core 5 of lithium sulfide for storing energy and a first shell 10 composed of $Li_4P_2S_7$ that functions as a super ionic solid electrolyte that protects the core 5 from polysulfide shuttle. By "super ionic solid electrolyte" it is meant that the $Li_4P_2S_7$ of the first shell 10 allows for the diffusion of lithium ions ($Li^+$) to and from the core 5 of the composite core shell material 100. Carbon is typically added to the wet synthesis method to provide at least one second shell 15 that is composed of at least $Li_4P_2S_7$ and carbon (C). The carbon increases the electronic conductivity of the composite core shell material 100 in comparison to a shell material of $Li_4P_2S_7$ that does not include carbon (C). The details of at least one embodiment of a method of forming a composite core shell material 100 including $Li_4P_2S_7$ are now described in more detail with reference to FIG. 2. It is noted that the process sequence illustrated in FIG. 2 is not limited to only the steps that of the depicted process flow, as other initial and final process steps may be employed. Further, intermediate process steps have also been contemplated.

In one embodiment, the process flow depicted in FIG. 2 may begin with forming a first mixture including a solid component of a first portion of lithium sulfide ($Li_2S$) and diphosphorus pentasulfide ($P_2S_5$) in a ratio ranging from 0.75:1 to 1.25:1 with a liquid solvent comprising carbon and hydrogen at step 20. Lithium sulfide ($Li_2S$) and diphosphorus pentasulfide ($P_2S_5$) are both solids and typically have a low solubility in solvents, e.g., organic solvents. Therefore, it can be difficult to achieve practical concentrations of lithium sulfide ($Li_2S$) and diphosphorus pentasulfide ($P_2S_5$) within an organic solvent to form a coating solution. Surprisingly, in some embodiments, it has been determined that lithium sulfide ($Li_2S$) and diphosphorus pentasulfide ($P_2S_5$) may be dissolved in an organic solvent of acetonitrile ($CH_3CN$), when the lithium sulfide ($Li_2S$) and diphosphorus pentasulfide ($P_2S_5$) are mixed at a ratio of about 1:1. In one example, the lithium sulfide ($Li_2S$) and diphosphorus pentasulfide ($P_2S_5$) are mixed at a ratio of exactly 1:1. The lithium sulfide ($Li_2S$) reacts with diphosphorus pentasulfide ($P_2S_5$) to form a 1 to 1 stoichiometric complex that has a high solubility in acetonitrile. In one example of a typical reaction, the acetonitrile dissolves at least 25 wt. % of the $Li_2S$—$P_2S_5$ complex. In another example of a typical reaction, the acetonitrile dissolves from 10 wt. % of the $Li_2S$—$P_2S_5$ complex to 10 wt. % of the $Li_2S$—$P_2S_5$ complex.

During mixing of the lithium sulfide ($Li_2S$) and diphosphorus pentasulfide ($P_2S_5$) with the organic solvent of acetonitrile ($CH_3CN$) at step 20 of the process flow depicted in FIG. 2, the 1 to 1 (hereafter referred to as "1:1") ratio $Li_2S$—$P_2S_5$ solution reacts with lithium sulfide ($Li_2S$) to form $Li_4P_2S_7$, which is a 2 to 1 (hereafter referred to as "2:1") ratio product of $Li_2S$—$P_2S_5$. $Li_4P_2S_7$ is a super-ionic solid electrolyte that is insoluble in organic solvents. Referring to FIG. 1, the 1:1 ratio $Li_2S$—$P_2S_5$ solution enables the coating of a core 5 of lithium sulfide ($Li_2S$) with a first shell 10 of $Li_4P_2S_7$, in which the first shell 10 is a 2:1 ratio product of $Li_2S$—$P_2S_5$. The first shell 10 of $Li_4P_2S_7$ is the product of a surface reaction between $Li_2S$ and the $Li_2S$—$P_2S_5$ solution. In one embodiment, the first shell 10 of the composite core shell material 100 imparts excellent ion conductivity to the core 5 of $Li_2S$. By "ion conductivity" it is meant that ions, such as lithium ($Li^+$) ions, can diffuse through the first shell 10 to the core 5 of the composite core shell material 100, and that ions, such as lithium ($Li^+$) ions, from the core 5 can diffuse through the first shell 10 to the exterior of the core shell material 100.

Forming the first mixture may include dry milling of the lithium sulfide ($Li_2S$) and diphosphorus pentasulfide ($P_2S_5$) followed by mechanical mixing with the solvent comprising carbon (C) and hydrogen (H), e.g., acetonitrile. The lithium sulfide ($Li_2S$) powder may have an average particle size ranging from 0.5 to 20 microns. The diphosphorus pentasulfide ($P_2S_5$) may have an average particle size ranging from 0.5 to 20 microns. Although, the solvent comprising carbon and hydrogen has been described above as acetonitrile, it is not intended that the present disclosure is not limited to only acetonitrile. The carbon and hydrogen solvent may be any solvent that is suitable for dissolving lithium sulfide ($Li_2S$) and diphosphorus pentasulfide ($P_2S_5$). For example, in addition to acetonitrile, other examples of the solvents that are suitable for the process sequence illustrated in FIG. 2 include, but are not limited to, at least one of acetone, dichloromethane (DCM), tetrahydrofuran (THF), ethyl acetate, dimethylformamide (DMF), dimethyl sulfoxide (DMSO), dimethoxyethane (DME) and a combinations thereof.

Milling is a process that in some embodiments employs compression and/or shear forces to reduce the average particles size of a solid material, such as a powder. Some apparatus that may be employed for milling of lithium sulfide ($Li_2S$) and diphosphorus pentasulfide ($P_2S_5$) include ball mills, vibratory mills, attrition mills, fluid energy mills and roller mills. The milled lithium sulfide ($Li_2S$) and/or diphosphorus pentasulfide ($P_2S_5$) may have an average particle size ranging from 0.01 µm to 5 µm. In another embodiment, the milled lithium sulfide ($Li_2S$) and/or diphosphorus pentasulfide ($P_2S_5$) may have an average particle size ranging from 0.01 µm to 5 µm. The timing for milling of the lithium sulfide ($Li_2S$) and diphosphorus pentasulfide ($P_2S_5$) is typically dependent upon the original size of the raw material, the desired size for the milled product, and the milling mechanism. For example, a ball mill is typically a hollow rotating cylinder that is least partially filled with wear resistant media having the shapes or rods, short cylinders, and/or balls, wherein the tumbled media provides a grinding action by impacting and shearing the particles of lithium sulfide ($Li_2S$) and diphosphorus pentasulfide ($P_2S_5$) on their surfaces. The ball mill media is only one factor that impacts the milling time for providing a desired size for the milled produced, e.g., milled lithium sulfide ($Li_2S$) and/or diphosphorus pentasulfide ($P_2S_5$). In one example, dry milling of the lithium sulfide ($Li_2S$) and/or diphosphorus pentasulfide ($P_2S_5$) may include milling, e.g., dry ball milling, for a time period of 3 hours of less. In another example, dry milling of the lithium sulfide ($Li_2S$) and/or diphosphorus pentasulfide ($P_2S_5$) may include milling, e.g., dry ball milling, for a time period of ranging from 1 hour to 3 hours. In yet another example, the dry milling of the lithium sulfide ($Li_2S$) and/or diphosphorus pentasulfide ($P_2S_5$) may include milling, e.g., dry ball milling, for a time period of 2 hours. In one embodiment, the lithium sulfide ($Li_2S$) powder and diphosphorus pentasulfide ($P_2S_5$) powder are dry milled together to provide a homogeneous mixture of lithium sulfide ($Li_2S$) and diphosphorus pentasulfide ($P_2S_5$). Milling of the lithium sulfide ($Li_2S$) and/or diphosphorus pentasulfide ($P_2S_5$) may be at a temperature ranging from 20° C. to 25° C.

Following dry milling, the lithium sulfide ($Li_2S$) and diphosphorus pentasulfide ($P_2S_5$) may be mechanical mixed with the solvent comprising carbon and hydrogen, e.g., acetonitrile, to provide the first mixture, as illustrated at step 20 of the process flow depicted in FIG. 2. In one embodiment, the mixing of the lithium sulfide ($Li_2S$) and diphosphorus pentasulfide ($P_2S_5$) with the solvent comprising carbon and hydrogen includes at least one of the mechanisms of convection, shear and diffusion to provide a homogenous mixture. Any mixer may be any type of mixer that is suitable for stifling the solution of $Li_2S$—$P_2S_5$ and the organic solvent in a manner that causes the lithium sulfide ($Li_2S$) and diphosphorus pentasulfide ($P_2S_5$) to dissolve in the organic solvent, e.g., acetonitrile. For example, the mechanical mixer may include an impeller mixer, paddle type mixer, planetary mixer, flat blade turbine mixers, anchor mixer, wet ball mill and a combination or variation thereof. It is noted that the mixing time is selected to allow for the lithium sulfide ($Li_2S$) and diphosphorus pentasulfide ($P_2S_5$) to dissolve in the organic solvent, e.g., acetonitrile. In some embodiments, the mixing time for forming the first mixture may be reduced by increasing the mixing speed. In some embodiments, the mixing time for forming the first mixture may range from 0.5 minutes to 10 hours. The first mixture is formed at a temperature ranging from 20° C. to 25° C. The first mixture may further include additives for viscosity adjustments and pH adjustment.

With the formation of the first mixture, a first shell 10 of $Li_4P_2S_7$ is formed on a core 5 of lithium sulfide ($Li_2S$). The first shell 10 of the composite core shell material 100 is substantially free of carbon (C). By "substantially free of carbon", it is meant that the amount of carbon (C) that is present in the first shell 10 of the composite core shell material 100 is 5 wt. % or less. In one embodiment, a first shell 10 that is substantially free of carbon (C) has a carbon (C) content that is 2.5 wt % or less. Typically, the structure including the first shell 10 of $Li_4P_2S_7$ on the core 5 of lithium sulfide ($Li_2S$) that is formed in step 20 of the process flow depicted in FIG. 2 has a low electrical conductivity. In one embodiment, the structure including the first shell 10 of $Li_4P_2S_7$ on the core 5 of lithium sulfide ($Li_2S$) typically has a maximum ionic conductivity equal to $10^{-8}$ $scm^{-1}$ or less. For example, the structure including the first shell 10 of $Li_4P_2S_7$ on the core 5 of lithium sulfide ($Li_2S$) may have an electrical conductivity that ranges from $2.5\times10^{-4}$ S/cm to $1\times10^{-6}$ S/cm.

Referring to FIG. 1, to increase conductivity of the composite core shell material, at least one second shell 15 of $Li_4P_2S_7$ and carbon (C) is formed on the first shell 10 of composite core shell material 100. To form the second shell 15 of $Li_4P_2S_7$ and carbon (C), a second mixture is formed of $Li_4P_2S_7$ and carbon (C), as step 25 of the process flow depicted in FIG. 2. The second mixture is formed by mixing a second portion of lithium sulfide ($Li_2S$) powder with carbon (C) powder. The second portion of lithium sulfide ($Li_2S$) powder is similar to the first portion of lithium sulfide ($Li_2S$) powder that is mixed with diphosphorus pentasulfide ($P_2S_5$) in step 20 of the process flow depicted in FIG. 2. Therefore, the description of the lithium sulfide (Li2S) powder that is made above with reference to FIG. 1 is suitable for the lithium sulfide (Li2S) powder that is mixed with carbon (C) to form the second mixture at step 25 of the process flow depicted in FIG. 2. In one example, the second portion of lithium sulfide ($Li_2S$) powder has an average particle size ranging from 0.01 microns to 5 microns.

The carbon (C) powder may be carbon black, porous carbon, activated carbon, single layer graphene molecules, multilayer graphene molecules, carbon fiber, carbon nanotubes or a combination thereof. It is noted that the above examples of types of carbon (C) powder that are suitable for use with the present disclosure are provided for illustrative purposes only, and are not intended to limit the present disclosure, as any type of carbon (C) powder may be suitable for the methods and structures disclosed herein.

In one embodiment, the second mixture of the second portion of lithium sulfide ($Li_2S$) and carbon (C) powder may be formed by dry milling lithium sulfide ($Li_2S$) and the carbon (C) powder together to provide a homogenous mixture. The second portion of lithium sulfide ($Li_2S$) and the carbon (C) powder may be mixed in a ratio of lithium sulfide ($Li_2S$) to carbon (C) powder that ranges from 20:1 to 0.5:1. In another embodiment, the second portion of lithium sulfide ($Li_2S$) and the carbon (C) powder may be mixed in a ratio of lithium sulfide ($Li_2S$) to carbon (C) powder that ranges from 2:1 to 0.5:1.

The timing for milling of the lithium sulfide ($Li_2S$) and carbon (C) powder is typically dependent upon the original size of the raw material, the desired size for the milled product, and the milling mechanism. In one example, dry milling of the lithium sulfide ($Li_2S$) and carbon (C) powder may include milling, e.g., dry ball milling, for a time period of 3 hours of less. In another example, dry milling of the lithium sulfide ($Li_2S$) and carbon (C) powder may include milling, e.g., dry ball milling, for a time period of ranging from 1 hour to 3 hours. Milling of the lithium sulfide ($Li_2S$) and carbon (C) powder may be at a temperature ranging from 20° C. to 25° C. The dry milling method for forming the second mixture of lithium sulfide ($Li_2S$) and carbon (C) powder may be formed using a ball mill, a vibratory mill, an attrition mill, a fluid energy mill, a roller mill, or a combination thereof. In one embodiment, the second portion of the lithium sulfide (Li2S) and the carbon (C) powder may be milled together. In another embodiment, the second portion of lithium sulfide ($Li_2S$) and carbon (C) may be milled separately from one another and then mixed using mechanical mixing. In one embodiment, the milled lithium sulfide ($Li_2S$) of the second mixture may have an average particle size ranging from 0.01 μm to 5 μm. In another embodiment, the lithium sulfide ($Li_2S$) of the second mixture may have an average particle size ranging from 0.01 μm to 0.5 μm. In one embodiment, the milled carbon of the second mixture may have a particle size ranging from 0.01 μm to 5 μm. In another embodiment, the milled carbon of the second mixture may have an average particle size ranging from 0.01 μm to 0.5 μm. The second mixture is formed at a temperature ranging from 20° C. to 40° C.

Typically, the second portion of lithium sulfide ($Li_2S$) powder and carbon (C) powder of the second mixture should be mixed, e.g., milled, separately from the first mixture that contains the first portion of lithium sulfide ($Li_2S$) powder and diphosphorus pentasulfide ($P_2S_5$) powder. In one embodiment, by separately mixing, e.g., milling, the second portion of lithium sulfide ($Li_2S$) power and carbon (C) powder from the first mixture that includes a first component of the composite core shell material 100 that includes the first shell 10 of $Li_4P_2S_7$ encapsulating a core 5 of lithium sulfide ($Li_2S$), possible damage to the first shell 10 of $Li_4P_2S_7$ by milling with carbon (C) can be eliminated.

Turning to step 30 of the process flow depicted in FIG. 2, following the formation of the first shell 10 of $Li_4P_2S_7$ on the core 5 of lithium sulfide ($Li_2S$), the first mixture that is formed at step 20 is mixed with the second mixture that is formed at step 25. The addition of the second mixture of a second portion of lithium sulfide ($Li_2S$) and carbon (C) powder to the first mixture that is formed at step 20 of the process flow depicted in FIG. 2, typically forms at least one second shell 15 composed of $Li_4P_2S_7$ and carbon (C) encapsulating the first shell 10 of $Li_4P_2S_7$. In some embodiments, the intimate contact of the second shell 15 composed of lithium sulfide ($Li_2S$) and carbon (C) on the first shell 10 of $Li_4P_2S_7$ on the core 5 of lithium sulfide ($Li_2S$) enables the conducting of electrons at the oxidation and reduction of the cathode materials during the operation of batteries.

In one embodiment, the mixing of the first mixture that is formed in step 20 with the second mixture that is formed in step 25 includes at least one of the mechanisms of convection, shear and diffusion to provide a homogenous mixture. Any mixer is suitable for mixing the second mixture including the second portion of lithium sulfide ($Li_2S$) and carbon (C) powder with the solution of lithium sulfide ($Li_2S$) and diphosphorus pentasulfide ($P_2S_5$) in the organic solvent that comprises carbon (C) and hydrogen (H), e.g., acetonitrile, provided by the first mixture, so long as the mixer dissolves the second mixture within the solution of the first mixture. For example, the mixer may include an impeller mixer, paddle type mixer, planetary mixer, flat blade turbine mixers, anchor mixer, wet ball mill and a combination or variation thereof.

It is noted that the mixing time for step 30 of the process flow depicted in FIG. 2 is selected to allow for the second mixture including the second portion of lithium sulfide ($Li_2S$) and carbon (C) powder to dissolve in the organic solvent, e.g., acetonitrile, of the first mixture, which includes the first shell 10 of $Li_4P_2S_7$ on the core 5 of lithium sulfide ($Li_2S$). In some embodiments, the mixing time for combining the first mixture and the second mixture may be reduced by increasing the mixing speed. In some embodiments, the mixing time for mixing the first mixture that was produced in step 20 with the second mixture that was produced in step 25 may range from 0.5 minutes to 10 hours. In one example, the solution of lithium sulfide ($Li_2S$) and diphosphorus pentasulfide ($P_2S_5$) in the organic solvent that comprises carbon and hydrogen, e.g., acetylene, provided by the first mixture is mixed with the second mixture of lithium sulfide ($Li_2S$) and carbon (C) powder using a wet ball mill for a time period of about 2 hours. The first mixture and the second mixture may be combined at a temperature ranging from 20° C. to 25° C. Combining the first mixture and the second mixture at step 30 of the process flow depicted in FIG. 2 may further include additives for viscosity adjustments.

In some embodiments, the composition of the at least one second shell 15 includes 5% to 70% carbon with a remainder of $Li_4P_2S_7$. In one embodiment, the composition of the at least one second shell 15 includes 50% $Li_4P_2S_7$ and 50% carbon (C). The carbon (C) content of the at least one second shell 15 of the composite core shell material 100 provides the electrical conductivity performance of the composite core shell material 100. Therefore, in some embodiments, the carbon content of the composite core shell material 100 may be increased or decreased depending upon the intended application of the composite core shell material.

Step 30 of the process flow depicted in FIG. 2 provides at least one second shell composed of $Li_4P_2S_7$ and carbon (C) powder. The mixture formed at step 30 of the process flow depicted in FIG. 2 by combining the first mixture including a solid component of a first portion of lithium sulfide ($Li_2S$) and diphosphorus pentasulfide ($P_2S_5$) in a ratio ranging from 0.75:1 to 1.25:1 with a liquid solvent comprising carbon and hydrogen that is formed at step 20, and the second mixture of lithium sulfide ($Li_2S$) and carbon (C) that is formed at step 25, is hereafter referred to as a third mixture. The third mixture includes the composite core shell material 100 including the at least one second shell 15 composed of carbon (C) and $Li_4P_2S_7$ that is present on the first shell 10 of $Li_4P_2S_7$, in which the first shell 10 is present on the core 5 of lithium sulfide ($Li_2S$). The third mixture also includes the organic solvent, e.g., acetonitrile.

Referring to step 35, in one embodiment, the third mixture is dried to remove the organic solvent and to provide a powder of composite core shell material 100. In one embodiment, the organic solvent, e.g., acetonitrile, is evaporated from the third mixture. In some embodiments, heating the third mixture accelerates the removal of the organic solvent, e.g., acetonitrile. Any heat source may be employed to dry the third mixture. For example, the heat source may me a furnace or heat lamps. In some embodiments, the third mixture is heated to a temperature that ranges from 60° C. to 200° C. In another embodiment, the mixture is heated to a temperature that ranges from 120° C. to 160° C.

Referring to FIG. 1, following removal of the organic solvent, e.g., acetonitrile, from the third mixture, the composite core shell material 100 remains. The composite core shell material 100 includes lithium sulfide ($Li_2S$) core 5 having a longest axis ranging from 1 micron to 100 microns, and a first shell 10 comprised of $Li_4P_2S_7$ in direct contact with an exterior surface of the lithium sulfide ($Li_2S$) core 5. Typically, the first shell 10 encapsulates the lithium sulfide ($Li_2S$) core 5. By "encapsulates" it is meant that the core 5 of lithium sulfide ($Li_2S$) is confined within the first shell 10 of $Li_4P_2S_7$. The lithium sulfide ($Li_2S$) core 5 may be composed entirely, i.e., 100%, of lithium sulfide ($Li_2S$). In some embodiments, the core 5 may be composed of lithium sulfide ($Li_2S$) and incidental impurities. As used herein, the term "incidental impurities" refers to elements that are not purposeful additions to the core 5, but that due to impurities and/or leaching from contact with manufacturing equipment, trace quantities of such elements being no greater than 0.05 wt % individually, and not grater than 1% when measured in combination, may find their way into the final core composition.

Referring to FIG. 1, in some embodiments, the core 5 of the composite core shell material 100 may have a spherical geometry, in which the longest axis of the core is a diameter D1, which is equal to 1 micron to 100 microns. In another embodiment, the diameter D1 of the composite core shell material 11 ranges from 25 microns to 75 microns. In yet another embodiment, the diameter D1 of the composite core shell material 11 ranges from 35 microns to 55 microns. Although the geometry of the core 5 of the core shell material 100 is depicted as being spherical, it is not intended that the core 5 of lithium sulfide ($Li_2S$) be limited to only this geometry, as other geometries for the core 5 are within the scope of the present disclosure. For example, the core 5 may have a geometry that is oblong, cylindrical or multi-sided.

Referring to FIG. 1, the first shell 10 that is comprised of $Li_4P_2S_7$ is typically substantially free of carbon (C). By "substantially free" it is meant that the maximum carbon content within the first shell is no greater than 1%. In some embodiments, the first shell 10 of $Li_4P_2S_7$ is entirely free of carbon, i.e., the carbon content within the first shell 10 is 0%. The first shell 10 of $Li_4P_2S_7$ may have a thickness T1 ranging from 1 nm to 100 nm. In another embodiment, the first shell 10 of $Li_4P_2S_7$ has a thickness T1 that ranges from 25 nm to 75 nm. In yet another embodiment, the first shell 10 of $Li_4P_2S_7$ has a thickness T1 that ranges from 35 nm to 55 nm.

The at least one second shell 15 that is composed of $Li_4P_2S_7$ and carbon (C) in direct contact with an exterior surface of the first shell 10 of $Li_4P_2S_7$. In one embodiment, each of the second shells 15 has a composition that includes 70% to 99% of $Li_4P_2S_7$ and 1% to 30% carbon (C). In another embodiment, each of the second shells 15 has a composition that includes 80% to 95% of $Li_4P_2S_7$ and 5% to 20% carbon (C). In some embodiments, at least one of the second shells 15 encapsulates the first shell of $Li_4P_2S_7$. In some embodiments, each of the at least one second shell has a thickness ranging from 1 nm to 100 nm. In another embodiment, the thickness of the at least one second shell ranges from 25 nm to 75 nm. In yet another embodiment, the thickness of each of the at one second shell ranges from 35 nm to 55 nm. Although FIG. 1 depicts a composite core shell material 100 having one second shell 15 of lithium sulfide ($Li_2S$) and carbon (C), it is noted that any number of second shells 15 may be present.

The final composition of the composite core shell material may have as great as 60 wt % lithium sulfide ($Li_2S$) or as great as 60 wt % carbon (C). In one example, the final composition of the composite core shell material 100 may include 50 wt % to 70 wt % lithium sulfide ($Li_2S$), 10 wt % to 30 wt % $Li_4P_2S_7$, and 10 wt % to 30 wt % carbon. In another example, the final composition of the composite core shell material 100 includes 30 wt % $Li_4P_2S_7$, 10 wt % carbon (C) and 60 wt % $Li_2S$. Although the geometry of the composite core shell material 100 is depicted as being spherical, it is not intended that the composite core shell material 100 be limited to only this geometry, as other geometries for the composite core shell material 100 are within the scope of the present disclosure. For example, the composite core shell material 100 may have a geometry that is oblong, cylindrical or multi-sided.

One application for the composite core shell material 100 that is depicted in FIG. 1, which can be produced by the process flow depicted in FIG. 2, is for the positive electrode of a wet cell lithium sulfur (Li—S) battery that employs an ether based wet (liquid) electrolyte. Because the portion of the composite core shell material 100 that is provided by the first shell 10 of $Li_4P_2S_7$ on the core 5 of lithium sulfide ($Li_2S$) is not an electrical conductor, the rate of the performance of a positive electrode composed of the composite core shell material 100 provided by the present disclosure may depend upon the particle size of the composite core shell material 100. In some embodiments, instead of reducing the size of the composite core shell material 100 into the nanometer range, it has been determined that excellent cycling performance may be provided by sizing the composite core shell material 100 within the micrometer range, e.g., having a size ranging from 0.01 μm to 5 μm, with nanometer domains of $Li_2S$ @$Li_4P_2S_7$ and carbon (C). By nanometer domains it is meant that agglomerates of core-shell particles are sized in the range of 10 nm to 100 nm. In one embodiment, the longest axis L1 of the composite core shell material 100 may range from 0.01 μm to 100 μm. In another embodiment, the longest axis L1 of the composite core shell material 100 may range from 10 μm to 50 μm.

In one embodiment, the composite core shell material 100 may be applied to a conductive substrate to provide a working electrode, e.g., positive electrode (also referred to as cathode), for a lithium sulfur (Li—S) wet battery cell. The conductive substrate may be composed of any material that is electrically conductive. The term "electrically conductive" means a material having a room temperature (20° C. to 25° C.) conductivity of greater than $10^{-8}$ $(\Omega\text{-m})^{-1}$. Examples of materials that are suitable for the electrically conductive include platinum, copper, aluminum, carbon and silicon. The silicon may be doped with carbon or an n-type dopant to provide the properties of an electrically conductive material.

To apply the composite core shell material 100 to the conductive substrate, the composite core shell material 100 is mixed with a solvent to provide a coating composition. The solvent may be an organic solvent. Examples of organic solvents that are suitable for being mixed with the composite core shell material 100 to form the coating composition include acetonitrile, acetone, dichloromethane (DCM), tetrahydrofuran (THF), ethyl acetate, dimethylformamide (DMF), dimethyl sulfoxide (DMSO), dimethoxyethane (DME) and a combinations thereof. In one embodiment, the composite core shell material 100 is mixed with the organic solvent in an amount ranging from 20 wt % to 80 wt %. In another embodiment, the composite core shell material 100 is mixed with the organic solvent in an amount ranging from 30 wt % to 70 wt %. It is noted that the above mixtures of composite core shell material 100 and organic solvent are provided for illustrative purposes only, the amount of composite core shell material 100 that is present in the mixture may be increased or decreased depending upon the amount of solid based electrolyte that is desired on the positive electrode of the battery. Further, the amount of composite core shell material 100 may also depend on the solubility of the composite core shell material 100 in the organic solvent. The composite core shell material 100 and the organic solvent may be mixed using any mechanical mixing apparatus, including but not limited to, an impeller mixer, a paddle type mixer, a planetary mixer, flat blade turbine mixers, an anchor mixer, a wet ball mill and a combination or variation thereof. The mixing time for forming the coating composition is selected so that the composite core shell material 100 is dissolved within the organic solvent. In one embodiment, the coating composition may be applied to the conductive substrate using a deposition process, such as spray deposition, brushing, curtain flow coating, dipping and derivatives and combinations thereof. Following deposition, the coating composition may then be dried to provide the positive electrode for a lithium sulfur (Li—S) wet battery cell. In one example, the final composition of the coating for the positive electrode includes 60 lithium sulfide ($Li_2S$):20 $Li_4P_2S_7$:20 carbon (C).

Figure 3:
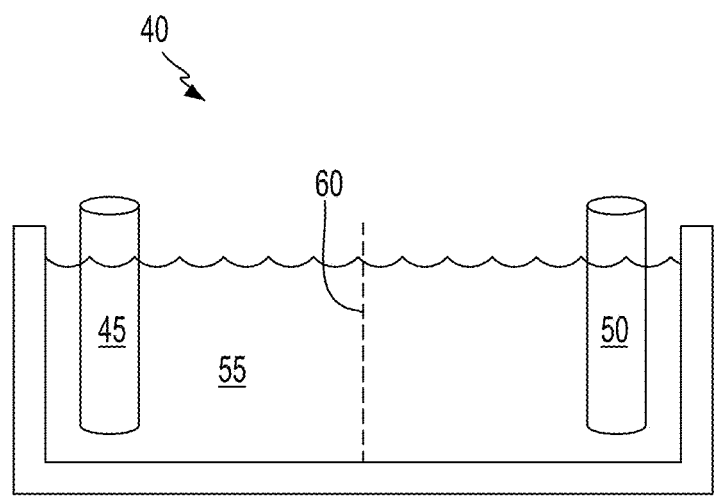
FIG. 3 is a pictorial view of a wet cell battery including at least one positive electrode coated with a composite core shell material having at least one shell with a composition that includes $Li_4P_2S_7$, in accordance with one embodiment of the present disclosure.

FIG. 3 depicts one embodiment of a lithium sulfur (Li—S) wet cell battery 40 including a positive electrode 45 that includes the coating of the composite core shell material 100. The carbon (C) within the at least one second shell 15 of the composite core shell material 100 that provides the positive electrode 45 conducts electrons and lithium ions ($Li^+$), and the first shell 10 of $Li_4P_2S_7$ of the composite core shell material 100 that provides the positive electrode 45 conducts lithium ions ($Li^+$). The first shell 10 of the $Li_4P_2S_7$ is a barrier to diffusion of polysulfides to the core 5 of the composite core shell material 100 that is comprised of the lithium sulfide ($Li_2S$).

The lithium sulfur (Li—S) wet cell battery 40 further includes a negative electrode 50. In one embodiment, the negative electrode 50 is composed of lithium (Li), silicon (Si), carbon (C) or a combination thereof. In one example, the negative electrode 50 may be composed of 100% lithium. In another example, the negative electrode 50 may be composed of carbon (C) that is coated with lithium (Li). A negative electrode 50 that is composed of carbon (C) may be employed in combination with the positive electrode 45 having the coating including the composite core shell material 100. In these embodiments, both the positive electrode and the negative electrode may provide the lithium ion ($Li^+$) source for the lithium sulfur (Li—S) wet cell battery 40. In some embodiments, the coating of the composite core shell material 100 that is present on the positive electrode 45 provides the lithium ion ($Li^+$) source of the composite core shell material 100. In these embodiments, the negative electrode 50 may be composed of an electrically conductive material, such as platinum (Pt) or carbon (C).

Still referring to FIG. 3, the positive electrode 45 and the negative electrode 50 are positioned in a liquid electrolyte 55. Typically, carbonate based electrolytes can react with the $Li_4P_2S_7$ of the composite core shell material 100. Considering the compatibility of the first shell 10 of $Li_4P_2S_7$ in the composite core shell material 100 and liquid electrolytes, an ether based electrolyte 55 was selected for the lithium sulfur (Li—S) wet cell battery 40. The ether based electrolyte 55 may include a solvent that is selected from the group consisting of dimethylethane (DME), triethylenegycol dimethyl ether (TEGDME), 1,3-dioxolane (DOL), tetrahydrofuran (THF), trioxane (TO) and combinations thereof. Inorganic and organic lithium containing salts may be suitable for cycling the lithium sulfur (Li—S) wet cell battery 40 including a positive electrode 45 having a coating of the composite core shell material 100. Examples of lithium containing salts that can provide the electrolyte component of the ether based electrolyte 55 include at least one of lithium bis(trifluoromethanesulfonyl)imide (LITFSI), $LiClO_4$, LiBr, $LiNO_3$ and combinations thereof. In one embodiment, the lithium sulfur (Li—S) wet cell battery 40 further includes a perforated polymeric sheet 60 present between the positive electrode 45 and the negative electrode 50. The perforated polymeric sheet 60 may serve as a barrier to dendrite growth between the positive electrode 45 and the negative electrode 50 that can result in shorting between the electrodes.

Figure 4:
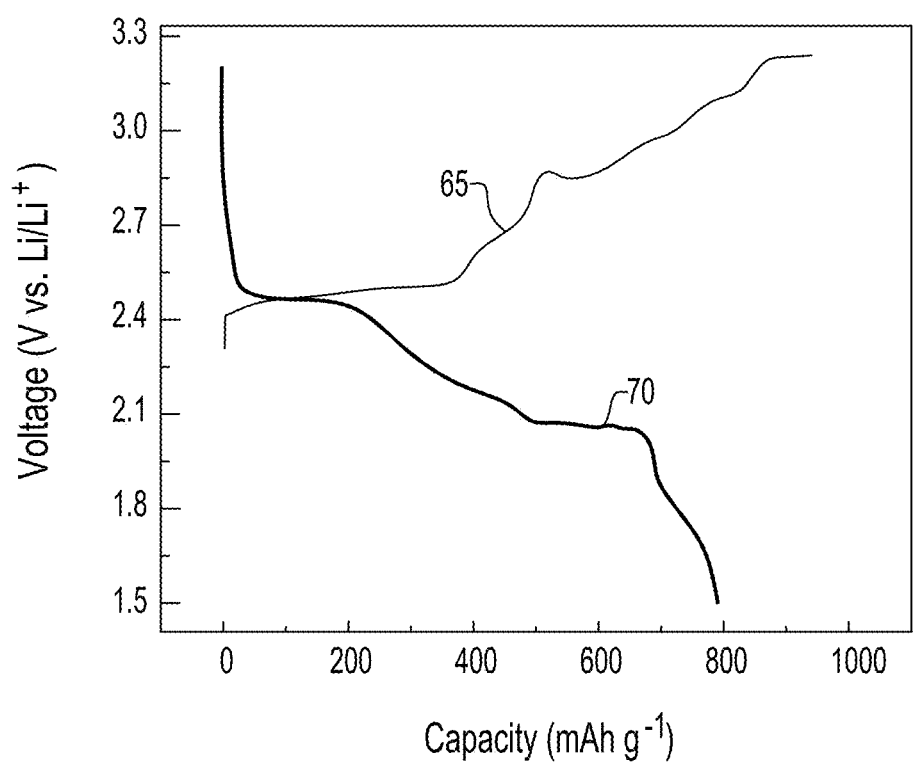
FIG. 4 is a plot of voltage vs. capacity for charge and discharge cycles from a wet cell battery including a positive electrode coated with a core shell material having at least one shell with a composition that includes $Li_4P_2S_7$, in accordance with one embodiment of the present disclosure.
Figure 5:
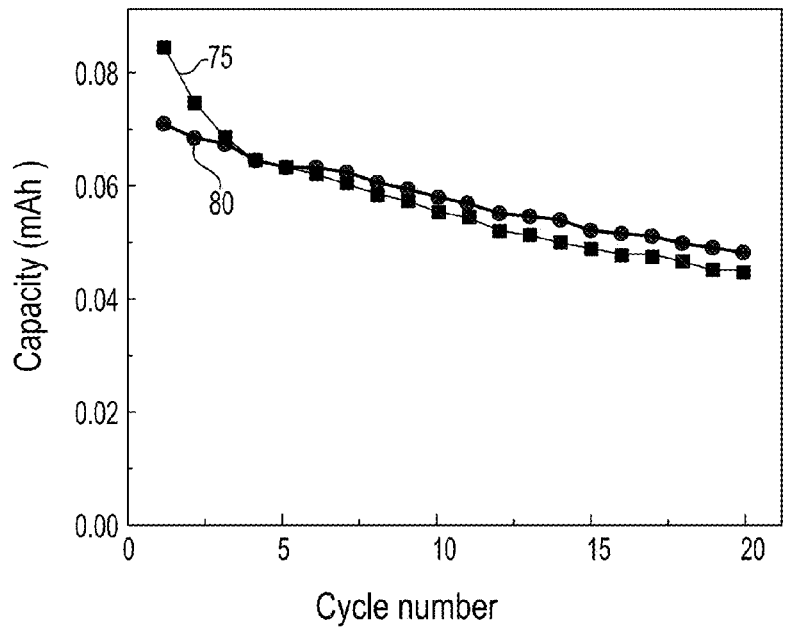
FIG. 5 is a plot of cycle number vs. capacity for charge and discharge cycles from a wet cell battery including a positive electrode coated with a core shell material having at least one shell with a composition that includes $Li_4P_2S_7$, in accordance with one embodiment of the present disclosure.

The positive electrode 45 including the coating of the composite core shell material 100 including a core of lithium sulfide ($Li_2S$), a first shell of $Li_4P_2S_7$ and a second shell of $Li_4P_2S_7$ and carbon (C) has a high initial charge and discharge capacity over 1000 mAh/g based on lithium sulfide ($Li_2S$). The calculation of capacity is normalized to the weight of lithium sulfide ($Li_2S$). FIG. 4 depicts a charge/discharge profile of a lithium sulfur (Li—S) wet cell battery 40 including a positive electrode 45 having a coating of the composite core shell material 100, which includes a $Li_2S$ core, a first shell composed of $Li_4P_2S_7$ and a second shell of $Li_4P_2S_7$ and carbon (C). Plot 65 in FIG. 4 is the charge profile, and plot 70 in FIG. 4 is the discharge profile. The charge and discharge profiles depicted in FIG. 4 are consistent with the performance of lithium sulfur (Li—S) batteries. The coating of the composite core shell material 100, which provides the positive electrode 45 of the lithium sulfur (Li—S) wet cell battery 40, typically has an excellent retention of capacity in repetitive cycling. FIG. 5 is a plot of capacity measured from the lithium sulfur (Li—S) wet cell battery 40 including a positive electrode having a coating of the composite core shell material 100 as a function of the charge and discharge cycles, i.e., cycle number, in which the composite core shell material 100 includes a lithium sulfide ($Li_2S$) core, a first shell composed of $Li_4P_2S_7$ and a second shell of $Li_4P_2S_7$ and carbon (C). Plot 75 in FIG. 5 is the charge profile, and plot 80 in FIG. 5 is the discharge profile. Except for the first charge and discharge cycle, all cycles have a coulombic efficiency over 96%. A high coulombic efficiency at 0.1 C rate indicates no shuttle phenomenon in the cell.

The positive electrode 45 of the lithium sulfur (Li—S) wet cell battery 40 that is depicted in FIG. 3 reduces polysulfide shuttle. More specifically, in one embodiment, the first shell 10 of the composite core shell material 100 is a solid electrolyte of $Li_4P_2S_7$ that encapsulates the core 5 of lithium sulfide and functions as a diffusion barrier layer to polysulfides. Lithium ions ($Li^+$) diffuse through the diffusion barrier layer, i.e., first shell 10, to the core 5 of the lithium sulfide during discharging of the lithium sulfur (Li—S) wet cell battery 40. The second shell 15 is conductive layer comprising at least $Li_4P_2S_7$ and carbon, which is present on the diffusion barrier layer provided by the first shell 10.

In contrast with conventional lithium sulfur (Li—S) batteries, i.e., lithium sulfur (Li—S) batteries employing a sulfur (S) positive electrode, the positive electrode including the composite core shell material 100 including the lithium sulfide ($Li_2S$) core, a first shell composed of $Li_4P_2S_7$ and a second shell of $Li_4P_2S_7$ and carbon (C) does not show any sign of sulfur dissolution in ether based electrolytes, which are typically a good solvent to sulfur (S) containing materials. The ether based electrolytes of the lithium sulfur (Li—S) wet cell batteries 40 disclosed herein, which include a positive electrode 45 having a coating of the composite core shell material 100, does not include sulfur containing species after any number of charge or discharge cycles. This proves that the first shell 10 of $Li_4P_2S_7$, which provides a solid electrolyte for the lithium sulfur (Li—S) wet cell battery 40, efficiently prevents the dissolution of sulfur (S), e.g., lithium sulfide ($Li_2S$). By removing the soluble sulfur (S) species from the electrolyte 55 of the lithium sulfur (Li—S) wet cell battery 40, the potential of exhibiting the polysulfide shuttle phenomenon is eliminated. Further, self-discharge of the lithium sulfur (Li—S) wet cell battery 40 is minimized. Therefore, the lithium sulfur (Li—S) wet cell batteries 40 that are disclosed herein, which include a positive electrode 45 having a coating of the composite core shell material 100 including a core of lithium sulfide ($Li_2S$), a first shell of $Li_4P_2S_7$, and a second shell of $Li_4P_2S_7$ and carbon (C) have an excellent shelf-life. For example, lithium sulfur (Li—S) wet cell batteries 40 including the positive electrode 45 with the coating of the composite core shell material 100 including at least one shell having $Li_4P_2S_7$ maintain a full charged cell for over two weeks. In comparison, a conventional lithium sulfur (Li—S) battery including a positive electrode that is composed of sulfur (S) or lithium sulfide ($Li_2S$), i.e., lithium sulfide ($Li_2S$) without the solid electrolyte and polysulfide diffusion barrier of $Li_4P_2S_7$, drops its potential by half after two weeks.

In another aspect of the present disclosure, a method of forming a lithium (Li) containing solid electrolyte material is provided. Lithium containing solid electrolytes are promising to eliminate the safety issues associated with organic liquid electrolytes employed in the commercial lithium ion ($Li^+$) batteries. Lithium phosphorus oxynitride (LiPON) has been shown to be stable against lithium (Li) metal, but also exhibits a poor ionic conductivity on the order of $10^{-6}$ $Scm^{-1}$. Further, sulfide-based glass or glass ceramic solid electrolytes typically exhibit an improved conductivity of $10^{-3}$ to $10^{-2}$ $Scm^{-1}$ when compared to lithium phosphorus oxynitride (LiPON), but sulfide-based glass or glass ceramic solid electrolytes are not compatible with lithium (Li) metal.

$Li_3PS_4$ is stable in contact with lithium (Li) metal, and $\beta$-$Li_3PS_4$ has an ionic conductivity of $3.0\times10^{-3}$ $Scm^{-1}$ at 227° C. "$\beta$-$Li_3PS_4$" is beta phase $Li_3PS_4$. Beta phase $Li_3PS_4$ has an orthorhombic crystal structure with at least one embodiment having a unit cell size of a=12.8190(5), b=8.2195(4), and c=6.1236(2) Å. But, with prior forms of $\beta$-$Li_3PS_4$ formed using high temperature methods, with a reduction of temperature to less than 227° C., the $\beta$-$Li_3PS_4$ is converted to $\gamma$-$Li_3PS_4$, and the ionic conductivity decreases by 4 orders of magnitude at room temperature, i.e., 20° C. to 25° C. "$\gamma$-$Li_3PS_4$" is gamma phase $Li_3PS_4$, which in at least one embodiment has an orthorhombic cell with a=7.70829(11), b=6.53521(10), and c=6.1365(7) Å. In one embodiment, a wet chemical synthesis method is provided for nanocrystalline $\beta$-$Li_3PS_4$, which is stable down to room temperature.

Figure 6:
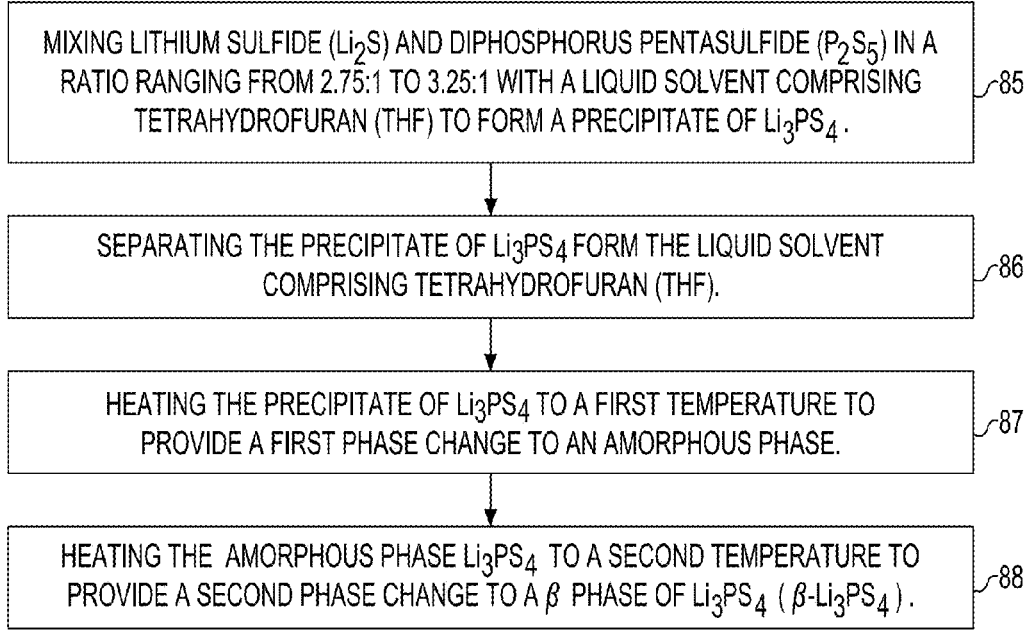
FIG. 6 is a flow chart of one embodiment of a method of forming a solid electrolyte of $\beta$-$Li_3PS_4$, in accordance with the present disclosure.

FIG. 6 depicts a flow chart of one embodiment of a method of forming a solid electrolyte of $\beta$-$Li_3PS_4$. The process flow for forming the solid electrolyte of $\beta$-$Li_3PS_4$ may begin with mixing lithium sulfide ($Li_2S$) and diphosphorus pentasulfide ($P_2S_5$) in a ratio ranging from 2.75:1 to 3.25:1 with a liquid solvent comprising tetrahydrofuran (THF) to form a precipitate of $Li_3PS_4$ at step 85. In one example, the lithium sulfide ($Li_2S$) and diphosphorus pentasulfide ($P_2S_5$) may be mixed in a ratio of 3:1. The mixing of the lithium sulfide ($Li_2S$) and diphosphorus pentasulfide ($P_2S_5$) in step 85 of the process flow that is depicted in FIG. 6 is similar to the mixing of the lithium sulfide ($Li_2S$) and diphosphorus pentasulfide ($P_2S_5$) in step 20 of the process flow depicted in FIG. 2. Therefore, the description of the mixing the lithium sulfide ($Li_2S$) and diphosphorus pentasulfide ($P_2S_5$) in step 20 of the process flow depicted in FIG. 2 is suitable for mixing the lithium sulfide ($Li_2S$) and diphosphorus pentasulfide ($P_2S_5$) in step 85 of the process flow depicted in FIG. 6. One difference between the process flow depicted in FIG. 2 and the process flow depicted in FIG. 6 is that the ratio of lithium sulfide ($Li_2S$) to diphosphorus pentasulfide ($P_2S_5$) in the process flow illustrated with reference to FIG. 2 ranges from 0.75:1 to 1.25:1 and the ratio of lithium sulfide ($Li_2S$) to diphosphorus pentasulfide ($P_2S_5$) for the process flow illustrated in FIG. 6 ranges from 2.75:1 to 3.25:1.

Although, the liquid solvent has been described above as tetrahydrofuran (THF), it is not intended that the present disclosure is not limited to only tetrahydrofuran (THF). For example, in addition to tetrahydrofuran (THF), other examples of the solvents that are suitable for the process sequence illustrated in FIG. 6 can include, but are not limited to, at least one of acetone, dichloromethane (DCM), acetonitrile, ethyl acetate, dimethylformamide (DMF), dimethyl sulfoxide (DMSO), dimethoxyethane (DME) and a combinations thereof. The mixing of the lithium sulfide ($Li_2S$) and diphosphorus pentasulfide ($P_2S_5$) at step 85 may be at a temperature ranging from 20° C. to 80° C. In another embodiment, the mixing of the lithium sulfide ($Li_2S$) and diphosphorus pentasulfide ($P_2S_5$) at step 85 may be at room temperature, e.g., a temperature ranging from 20° C. to 25° C. The mixing time for mixing lithium sulfide ($Li_2S$) and diphosphorus pentasulfide ($P_2S_5$) with a liquid solvent comprising tetrahydrofuran (THF) to form a precipitate of $Li_3PS_4$ may range from 0.1 hours to 72 hours. In another embodiment, the mixing time for mixing the lithium sulfide ($Li_2S$), diphosphorus pentasulfide ($P_2S_5$) and tetrahydrofuran (THF) may range from 4 hours to 12 hours.

The precipitate of $Li_3PS_4$ that is formed at step 85 may be a single crystal material. As used herein, the term "single crystal material" means a crystalline solid, in which the crystal lattice of the crystallite is substantially continuous and substantially unbroken to the edges of the crystallite, with substantially no grain boundaries. In some embodiments, the precipitate of $Li_3PS_4$ that is formed at step 85 is a polycrystalline material. Contrary to a single crystal crystalline structure, a crystallite having a polycrystalline crystal structure is made up of randomly oriented crystallites and containing large-angle grain boundaries, twin boundaries or both. At this stage of the process flow, in some embodiments, the precipitate if $Li_3PS_4$ is in a solvated phase, in which the solvent, such as tetrahydrofuran (THF), is present in the material in amounts up to 50 wt. %.

Referring to FIG. 6, in a following process step, the precipitate of $Li_3PS_4$ may be removed from the liquid solvent at step 86. In one embodiment, the precipitate of $Li_3PS_4$ may be removed from the liquid solvent by centrifuge. A centrifuge is a piece of equipment, generally driven by a motor, that puts an object in rotation around a fixed axis, applying a force perpendicular to the axis. The centrifuge works using sedimentation principles, where the centripetal acceleration causes more dense substances to separate out along the radial direction, i.e., toward the bottom of the centrifuge tube. By the same principle, lighter objects will tend to move to the top, i.e., to the top of the centrifuge tube (in the rotating picture, move to the center). In some embodiments, step 86 of the process flow depicted in FIG. 6 is optional. The precipitate of $Li_3PS_4$ may be allowed to precipitate from the liquid solvent by sedimentation without applying an additional force. The sedimentation of the precipitated $Li_3PS_4$ may then be screened from the liquid solvent.

In a following process step, the precipitate of $Li_3PS_4$ may be heated to provide at least one phase change to a recrystallized $\beta$-$Li_3PS_4$. By "recrystallized" it is meant that an amorphous phase of $Li_3PS_4$ is converted to a crystalline phase, such as a single crystal crystalline structure or a polycrystalline crystal structure. In one embodiment, heating of the precipitate of $Li_3PS_4$ to provide the at least one phase change to the recrystallized $\beta$-$Li_3PS_4$ includes a first phase change to an amorphous phase at a first temperature at step 87 of the process flow depicted in FIG. 6. As used herein, the term "amorphous" denotes a non-crystalline solid. In one example, the first temperature for the first phase change to an amorphous phase of the precipitate of $Li_3PS_4$ may be a temperature ranging from 90° C. to 110° C. In another example, the first temperature for the first phase change to an amorphous phase of the precipitate of $Li_3PS_4$ may be a temperature ranging from 95° C. to 105° C. In one example, the first temperature for the first phase change to an amorphous phase of the precipitate of $Li_3PS_4$ may at 100° C.

Step 88 of the process flow depicted in FIG. 6 includes heating the amorphous phase $Li_3PS_4$ to a second temperature to provide a second phase change to a $\beta$ phase of $Li_3PS_4$ ($\beta$-$Li_3PS_4$). The second temperature for the second phase change is greater than the first temperature. In one embodiment, the second temperature at which the phase change to the B phase occurs ranges from greater than 110° C. to 175° C. In one embodiment, the second temperature for the phase change to the $\beta$ phase (beta phase) occurs ranges from greater than 115° C. to 150° C. In one example, the second temperature for the phase change to the $\beta$ phase is at 120° C. The $\beta$ phase has an orthorhombic crystal structure, and recrystallized $\beta$-$Li_3PS_4$ may have a single crystal or polycrystalline crystal structure.

In some embodiments, the $\beta$-$Li_3PS_4$ that is provided by the flow chart depicted in FIG. 6 is a solid electrolyte material having a crystallite size of 250 nm or less. As used herein, the term "crystallite" means a material having a single crystal crystalline structure or a polycrystalline material having an aggregate of crystal grains. In one embodiment, the recrystallized $\beta$-$Li_3PS_4$ has a crystallite size of 1 nm to 100 nm. In another embodiment, the recrystallized $\beta$-$Li_3PS_4$ has a crystallite size of 10 nm to 50 nm.

The $\beta$-$Li_3PS_4$ may be a micro-strained structure characterized by a lattice strain ranging from 0.01% to 10%. In one embodiment, the lattice strain of the $\beta$-$Li_3PS_4$ may range from 1% to 8%. In another embodiment, the lattice strain of the $\beta$-$Li_3PS_4$ may range from 2.5% to 5%.

The recrystallized $\beta$-$Li_3PS_4$ may further be a porous structure that is characterized by a surface area that ranges from 5 $m^2g^{-1}$ to 25 $m^2g^{-1}$. In one embodiment, the surface area of the recrystallized $\beta$-$Li_3PS_4$ may range from 10 $m^2g^{-1}$ to 20 $m^2g^{-1}$. In yet another one embodiment, the surface area of the recrystallized $\beta$-$Li_3PS_4$ may range from 15 $m^2g^{-1}$ to 20 $m^2g^{-1}$. The pore size of the recrystallized $\beta$-$Li_3PS_4$ may range from 1 nm to 40 nm in diameter. In another embodiment, the pore size of the recrystallized $\beta$-$Li_3PS_4$ may range from 10 nm to 30 nm in diameter. In one example, the pore size of the recrystallized $\beta$-$Li_3PS_4$ is 28 nm.

The recrystallized $\beta$-$Li_3PS_4$ may have an ionic conductivity at room temperature, e.g., 20° C. to 25° C., ranging from $1.5 \times 10^{-4}$ $Scm^{-1}$ to $3.5 \times 10^{-4}$ $Scm^{-1}$. In one embodiment, the ionic conductivity at room temperature, e.g., 20° C. to 25° C., of the recrystallized $\beta$-$Li_3PS_4$ may range from $1.8 \times 10^{-3}$ $Scm^{-1}$ to $5 \times 10^{-6}$ $Scm^{-1}$. In yet another one embodiment, the ionic conductivity at room temperature, e.g., 20° C. to 25° C., of the recrystallized $\beta$-$Li_3PS_4$ may range from $1.8 \times 10^{-3}$ $Scm^{-1}$ to $1.5 \times 10^{-4}$ $Scm^{-1}$. In one embodiment, the recrystallized $\beta$-$Li_3PS_4$ formed using the wet chemical process that is described above with reference to FIG. 6 is stable at room temperature, e.g., 20° C. to 25° C. By "stable" at room temperature it is meant that the recrystallized $\beta$-$Li_3PS_4$ does not experience a phase change to $\gamma$-$Li_3PS_4$ at temperatures below 227° C., such as room temperature, e.g., 20° C. to 25° C., but instead remains in the beta phase, i.e., $\beta$-$Li_3PS_4$. Prior to the wet chemical process that is described herein, e.g., the process flow depicted in FIG. 6, high temperature processing had to be employed to form $\beta$-$Li_3PS_4$, wherein the $\beta$-$Li_3PS_4$ underwent a phase change to $\gamma$-$Li_3PS_4$ at temperatures of 227° C. or below. Phase change from $\beta$-$Li_3PS_4$ to $\gamma$-$Li_3PS_4$ results in a change in ionic conductivity from a high ionic conductivity, e.g., $3.0 \times 10^{-3}$ $Scm^{-1}$, at the $\beta$-$Li_3PS_4$ phase to a low ionic conductivity, e.g., $3.0 \times 10^{-7}$ $Scm^{-1}$, with a phase change to $\gamma$-$Li_3PS_4$. In some embodiments, the stabilization of $\beta$-$Li_3PS_4$ with low temperature wet chemical processing can be attributed to an increase in the surface energy and charge imbalance at the surface. The increased surface energy induces chemical lattice distortion in the $Li_3PS_4$, which in turn lowers the phase transition temperature to the $\beta$ phase of $Li_3PS_4$ ($\beta$-$Li_3PS_4$). The recrystallized $\beta$-$Li_3PS_4$ produced by the wet chemical synthesis method that is disclosed herein can be stabilized even to −10° C. by tuning the grain size to nanocrystals and by creating the nanoporous structure. More specifically, in some embodiments, the porous structure and micro-strain created by solvent removal, e.g., removal of tetrahydrofuran (THF), in forming the recrystallized $\beta$-$Li_3PS_4$ generates a large number of lattice defects, which can cause a charge imbalance. The smaller the grain size (nanocrystalline vs micro), the higher the surface energy of the system. The increased surface energy may induce chemical lattice distortion, which in turn lowers the phase transition temperature of the β-$Li_3PS_4$. Therefore, without be limited, it is believed that the stabilization of β-$Li_3PS_4$ at room temperature can be attributed to this increased surface energy and the resultant charge imbalance.

The enhancement in the conductivity for the recrystallized β-$Li_3PS_4$ may also originate from micro strain induced by solvent removal, e.g., removal of tetrahydrofuran (THF), and the space charge (size effect) at the interface created by the porous structure and the reduced grain size that is provided by the recrystallized β-$Li_3PS_4$. Lattice strain can be induced at the interface by highly dissimilar structures and atomic reconstruction. In some examples, it is believed that the as-synthesized particles, i.e., $Li_3PS_4$ that are not heat treated, are solvated (alloyed) with tetrahydrofuran (THF), which is removed during the heat-treatment (similar to de-alloying process), thus producing recrystallized β-$Li_3PS_4$ with microstrain and a porous structure. Further, with the significant decrease in the grain size to nanometer scale, the thickness of inter-granular region decreases significantly, generating numerous grain boundaries (evidence by the high surface area). The grain boundary differs in structure from the bulk material, resulting in the charge separation, i.e., the space charge region exhibits enhanced lithium vacancy conductivity. The lithium ionic conduction along this interfacial region is dominant in overall conduction in nanocrystalline samples, resulting in different activation energy. The nanoporous structure with micro strain creates a large number of lattice defects and a charge imbalance at the interfaces/grain boundaries, thus enhancing the ionic conductivity of the recrystallized β-$Li_3PS_4$ significantly when compared to β-$Li_3PS_4$ that is not formed using the wet chemical synthesis method described with reference to FIG. 6.

In one example, recrystallized β-$Li_3PS_4$ produced by the wet chemical synthesis method that is disclosed herein exhibits an ionic conductivity of $2.9 \times 10^{-4}$ Scm$^{-1}$ and $2.6 \times 10^{-3}$ Scm$^{-1}$ at 25° C. and 100° C., respectively. In some embodiments, the room temperature ionic conductivity of wet chemically synthesized β-$Li_3PS_4$ is improved significantly by 3 orders of magnitude as compared to γ-$Li_3PS_4$. In one example, the β-$Li_3PS_4$ exhibits an ionic conductivity of $4.5 \times 10^{-5}$ Scm$^{-1}$ at −10° C., which opens a wide temperature window for lithium batteries.

Figure 7:
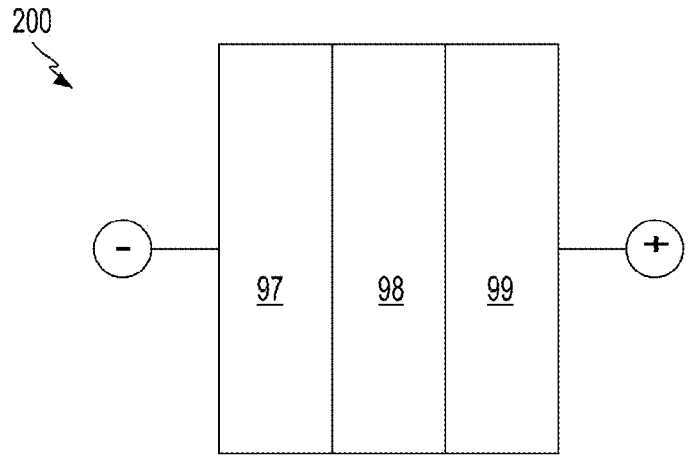
FIG. 7 is a pictorial view of a solid-state battery including a solid electrolyte of $Li_3PS_4$, in accordance with one embodiment of the present disclosure.

In a further aspect of the present disclosure, a solid state battery 200 is provided that includes a negative electrode 97 comprised of lithium (Li), a positive electrode 99 comprised of platinum, and a solid electrolyte 98 of β-$Li_3PS_4$, as depicted in FIG. 7. A solid-state battery 200 is a battery that has both solid electrodes and solid electrolytes. The solid electrolyte 98 of β-$Li_3PS_4$ may have a crystallite size of 250 nm or less, wherein the β-$Li_3PS_4$ is a micro-strained and a porous structure. The β-$Li_3PS_4$ that is used for the solid electrolyte 98 of the solid state battery 200 depicted in FIG. 7 is similar to the recrystallized β-$Li_3PS_4$ that is described above with reference to the flow chart depicted in FIG. 6. Therefore, the characteristics for the solid electrolyte 98 of β-$Li_3PS_4$, such as the surface area, crystallite size and ionic conductivity, are described above with reference to FIG. 6 for the recrystallized β-$Li_3PS_4$. Other materials that are suitable for the negative electrode 97 may include graphite and silicon and a combination thereof. Other materials that are suitable fore the positive electrode 88 may include metal oxides, metal phosphates, metal sulfides and a combination thereof. It is noted that the solid state battery 200 that is depicted in FIG. 7 is only one embodiment of a battery that may incorporate a solid electrolyte 98 of β-$Li_3PS_4$ that is formed using a wet chemical synthesis method. Other geometries of solid state batteries have been contemplated and are within the scope of the present disclosure.

Figure 8:
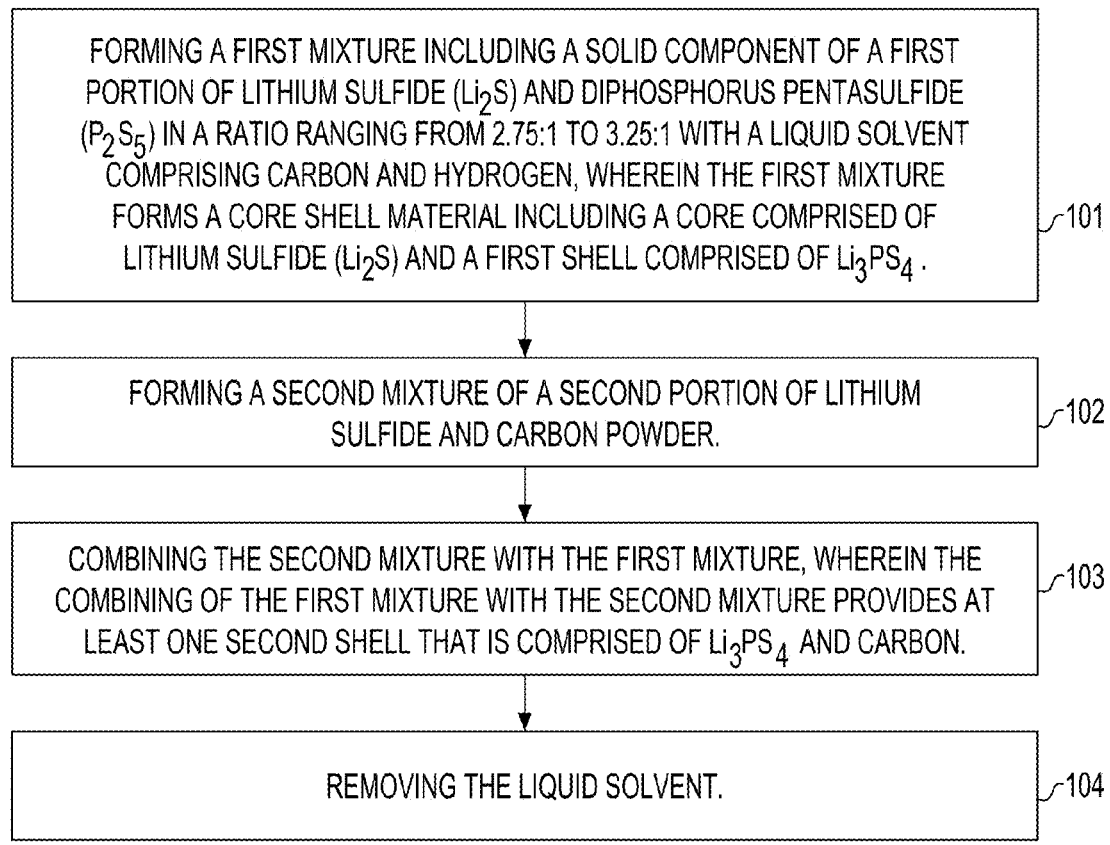
FIG. 8 is a flow chart of one embodiment of a method of forming a composite core shell material having at least one shell including $Li_3PS_4$, in accordance with the present disclosure.

In another aspect of the present disclosure, a method of forming a composite core shell material is provided that includes shells composed of β-$Li_3PS_4$, as depicted in the process flow illustrated in FIG. 8. In one embodiment, the composite core shell material that is formed by the process flow depicted in FIG. 8 includes a core of lithium sulfide ($Li_2S$), a first shell composed of β-$Li_3PS_4$ (recrystallized β-$Li_3PS_4$), and at least one second shell composed of β-$Li_3PS_4$ (recrystallized β-$Li_3PS_4$) and carbon (C). The method for forming the composite core shell material including at least one shell including β-$Li_3PS_4$ is similar to the method of forming the composite core shell material having at least one shell including $Li_4P_2S_7$ that is described above with reference to the process flow illustrated in FIG. 2. Therefore, the description of the mixing the lithium sulfide ($Li_2S$) and diphosphorus pentasulfide ($P_2S_5$) in step 20 of the process flow depicted in FIG. 2 is suitable for mixing the lithium sulfide ($Li_2S$) and diphosphorus pentasulfide ($P_2S_5$) in step 101 of the process flow depicted in FIG. 8. One difference between the process flow depicted in FIG. 2 and the process flow depicted in FIG. 8 is the ratio of lithium sulfide ($Li_2S$) to diphosphorus pentasulfide ($P_2S_5$) that is employed in forming the first mixture of step 20 of FIG. 2 and the ratio of lithium sulfide ($Li_2S$) to diphosphorus pentasulfide ($P_2S_5$) that is employed in forming the first mixture in step 101 of FIG. 8. In the process flow illustrated with reference to FIG. 2, the ratio of lithium sulfide ($Li_2S$) to diphosphorus pentasulfide ($P_2S_5$) for forming the first mixture at step 20 ranges from 0.75:1 to 1.25:1. In the process flow illustrated in FIG. 8, the ratio of lithium sulfide ($Li_2S$) to diphosphorus pentasulfide ($P_2S_5$) for forming the first mixture at step 101 ranges from 2.75:1 to 3.25:1. In one embodiment, the ratio of lithium sulfide ($Li_2S$) to diphosphorus pentasulfide ($P_2S_5$) for forming the first mixture at step 101 of the process flow depicted in FIG. 8 is selected for forming a first shell of $Li_3PS_4$ on a core of lithium sulfide ($Li_2S$). In one example, the ratio of lithium sulfide ($Li_2S$) to diphosphorus pentasulfide ($P_2S_5$) for forming the first mixture at step 101 of the process flow depicted in FIG. 8 is 3:1.

In one example, the liquid solvent comprising carbon and hydrogen that is mixed with the lithium sulfide ($Li_2S$) and diphosphorus pentasulfide ($P_2S_5$) at step 101 is tetrahydrofuran (THF), but it is not intended that the present disclosure be limited to only tetrahydrofuran (THF). For example, in addition to tetrahydrofuran (THF), other examples of the solvents that are suitable for the process sequence illustrated in FIG. 8 can include, but are not limited to, at least one of acetone, dichloromethane (DCM), acetonitrile, ethyl acetate, dimethylformamide (DMF), dimethyl sulfoxide (DMSO), dimethoxyethane (DME) and combinations thereof.

Still referring to step 101 of FIG. 8, mixing the lithium sulfide ($Li_2S$) and diphosphorus pentasulfide ($P_2S_5$) in a ratio ranging from 2.75:1 to 3.25:1 with a liquid solvent comprising carbon and hydrogen, e.g., tetrahydrofuran (THF), provides a first shell of $Li_3PS_4$ on a core of lithium sulfide ($Li_2S$). The first shell of $Li_3PS_4$ is substantially free of carbon (C). In one embodiment, a first shell that is substantially free of carbon (C) has a carbon (C) content that is 5 wt % or less. In another embodiment, a first shell that is substantially free of carbon (C) has a carbon (C) content that is 2.5 wt % or less. Further details regarding mixing the liquid containing solvent, the lithium sulfide ($Li_2S$) and the diphosphorus pentasulfide ($P_2S_5$) are described above in the description of step 20 of the process flow depicted in FIG. 2.

Referring to step 102 of the process flow depicted in FIG. 8, in one embodiment, a second mixture is formed of a second portion of lithium sulfide ($Li_2S$) and carbon (C) powder. Step 25 of the process flow depicted in FIG. 2 is similar to step 102 of the process flow depicted in FIG. 8. Therefore, the above description of step 25 of the process flow depicted in FIG. 2 is suitable to provide the details for step 102 of the process flow depicted in FIG. 8.

The second mixture may be combined with the first mixture after the first shell of the composite core shell material is formed at step 103 of the process flow that is depicted in FIG. 8. The combining of the first mixture with the second mixture provides at least one second shell that is comprised of $Li_3PS_4$ and carbon (C), wherein the at least one second shell is in contact with the first shell. In some embodiments, the composition of the at least one second shell of $Li_3PS_4$ and carbon (C) includes 5% to 70% carbon (C) with a remainder of $Li_3PS_4$. In one embodiment, the composition of the at least one second shell includes 50% $Li_3PS_4$ and 50% carbon (C). The carbon (C) content of the at least one second shell of the composite core shell material provides the electrical conductivity performance of the composite core shell material. Therefore, in some embodiments, the carbon content of the composite core shell material may be increased or decreased depending upon the intended application of the composite core shell material. Step 30 of the process flow depicted in FIG. 2 is similar to step 103 of the process flow depicted in FIG. 8. Therefore, the above description of step 30 of the process flow depicted in FIG. 2 is suitable to provide further details for step 103 of the process flow depicted in FIG. 8 with the exception that the second shell provided by the process flow depicted in FIG. 8 includes $Li_3PS_4$, and does not include $Li_4P_2S_7$ (which is provided by the process flow depicted in FIG. 2).

Referring to step 104 of FIG. 8, the solvent may then removed. In some embodiments, removing the solvent from the $Li_3PS_4$ may produce at least one phase change to a recrystallized $\beta$-$Li_3PS_4$. Removal of the liquid containing solvent of carbon (C) and hydrogen (H), e.g., tetrahydrofuran (THF), may include a heat treatment that effectuates the phase change in the as synthesized $Li_3PS_4$ to the beta phase of $Li_3PS_4$, i.e., $\beta$-$Li_3PS_4$. The details of the heat treatment for removing the liquid solvent of carbon (C) and hydrogen (H), e.g., tetrahydrofuran (THF), and effectuated a phase change in the as synthesized $Li_3PS_4$ to the beta phase are describe above with reference to steps 87 and 88 of the process flow that is depicted in FIG. 6. The mechanism by which $\beta$-$Li_3PS_4$ is stabilized to room temperature, e.g., 20° C. to 25° C., is also described above with reference to the method of forming recrystallized $\beta$-$Li_3PS_4$ using the wet chemical process illustrated by the process flow depicted in FIG. 6. The dimensions and the geometry of the composite core shell material including at least one shell composed of $\beta$-$Li_3PS_4$ that are provided by the process flow depicted in FIG. 8 are similar dimensions and geometries of the composite core shell material including at least one shell of $Li_4P_2S_7$, which are described above with reference to FIGS. 1 and 3.

In one embodiment, the composite core shell material produced by the process flow depicted in FIG. 8 includes a lithium sulfide ($Li_2S$) core having a longest axis ranging from 0.01 micron to 100 microns. A first shell of the composite core shell material that is comprised of $\beta$-$Li_3PS_4$ is in direct contact with an exterior surface of the lithium sulfide core ($Li_2S$) and encapsulates the lithium sulfide core ($Li_2S$). The first shell may have a thickness ranging from 1 nm to 100 nm. At least one second shell comprised of $\beta$-$Li_3PS_4$ and carbon (C) is present in direct contact with an exterior surface of the first shell. Each of at least one second shell may have a thickness that ranges from 1 nm to 100 nm. The composite core shell material produced by the process flow depicted in FIG. 8 may include 50 wt % to 70 wt % lithium sulfide ($Li_2S$), 10 wt % to 30 wt % $\beta$-$Li_3PS_4$, and 10 wt % to 30 wt % carbon. In one application, the composite core shell material including the $\beta$-$Li_3PS_4$ shell composition has an ionic conductivity at room temperature, e.g., 20° C. to 25° C., ranging from $1.0\times10^{-6}$ S/cm to $1.0\times10^{-3}$ S/cm. The ionic conductivity for the composite core shell material including the $\beta$-$Li_3PS_4$ shell composition may be suitable for battery components.

In one embodiment, a wet cell battery is provided that includes a positive electrode including a composite core shell material, in which at least one shell has a composition that includes $\beta$-$Li_3PS_4$. The wet cell battery including the positive electrode of the composite core shell material having the $\beta$-$Li_3PS_4$ shell composition is similar to the wet cell battery that is depicted in FIG. 3. Details for forming a positive electrode using a composite core shell material are described above with reference to FIG. 3. For example, to provide a positive electrode, the composite core shell material including $\beta$-$Li_3PS_4$ that is formed using the wet chemical synthesis method depicted in FIG. 8 is mixed with a solvent, wherein the mixture of solvent and the composite core shell material may be applied to a conductive substrate using a deposition method, such as spraying or brushing. The description of the negative electrode 50 and the liquid electrolyte 55 that is depicted in FIG. 3 is suitable for the negative electrode and liquid electrolyte for the wet cell battery including the positive electrode of the composite core shell material having the $\beta$-$Li_3PS_4$ shell composition.

The positive electrode of the composite core shell material having the $\beta$-$Li_3PS_4$ shell composition may reduce polysulfide shuttle in wet cell batteries. More specifically, in one embodiment, the first shell of the composite core shell material is a solid electrolyte of $\beta$-$Li_3PS_4$ that encapsulates the core of lithium sulfide ($Li_2S$) and functions as a diffusion barrier layer to polysulfides. Lithium ions ($Li^+$) diffuse through the diffusion barrier layer, i.e., first shell, to the core of the lithium sulfide ($Li_2S$) during discharging of the lithium sulfur (Li—S) wet cell battery. The second shell is an electrically conductive layer comprising at least $\beta$-$Li_3PS_4$ and carbon (C), which is present on the diffusion barrier layer provided by the first shell.

The following examples are provided to further illustrate the some aspects of the present disclosure and demonstrate some advantages that arise there from. It is not intended that the present disclosure be limited to the specific examples disclosed.

Preparation of Test Samples

In one example, $Li_2S$ (Aldrich 99%) and $P_2S_5$ (Sigman-Aldrich, 99%) having a stoichiometry of 3:1 were mixed in anhydrous tetrahydrofuran (THF, Sign-Aldrich) at room temperature, e.g., 20° C. to 25° C., in an argon (Ar) filled glove box. The mixture was then stirred for approximately 8 hours. Precipitation of $Li_3PS_4$, which was white in color, was then separated from the mixture by centrifuge and washed with tetrahydrofuran (THF) three times, and collected for characterization. A first portion of the as-synthesized precipitation was retained for characterization (hereafter referred to as "as-synthesized precipitation of $Li_3PS_4$"), and a second portion of the as-synthesized precipitation was heated to provide at least one phase change to a recrystallized $\beta$-$Li_3PS_4$ (hereafter referred to as "recrystallized $\beta$-Li$_3$PS$_4$"). More specifically, to provide the recrystallized $\beta$-Li$_3$PS$_4$, the as-synthesized precipitation was subject to elevated temperatures at 100° C., 120° C. and 140° C. under vacuum to remove the tetrahydrofuran (THF).

Test samples for characterization of the ionic conductivity for the recrystallized $\beta$-Li$_3$PS$_4$ were formed into pellets (hereafter referred to as "recrystallized $\beta$-Li$_3$PS$_4$ pellets") having a diameter of approximately 12.5 mm and a thickness of approximately 1 mm. The recrystallized $\beta$-Li$_3$PS$_4$ pellets were prepared by pressing the powder with carbon-coated aluminum foil on both sides in argon-filled glove box. The pellet was sealed in a cell using stainless steel disks as blocking electrodes. A.C. impedance measurements were conducted in the frequency range of 10 MHz to 1 Hz with the amplitude of 100 mV by using impedance analyzer (Solartron 1260). The temperature was controlled between −10° C. to 90° C. in a temperature chamber (Maccor, ±0.5° C.).

Scanning Electron Images of Li$_3$PS$_4$

Figure 9:
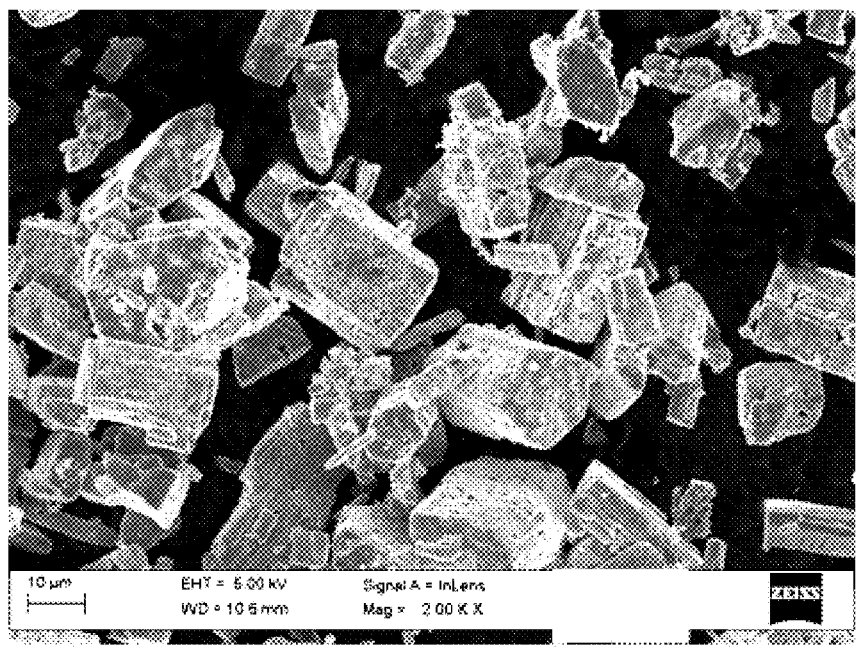
FIG. 9 is an image from a scanning electron microscope of $Li_3PS_4$ that is synthesized using a wet chemical process and has not been heat treated, in accordance with one embodiment of the present disclosure.
Figure 10:
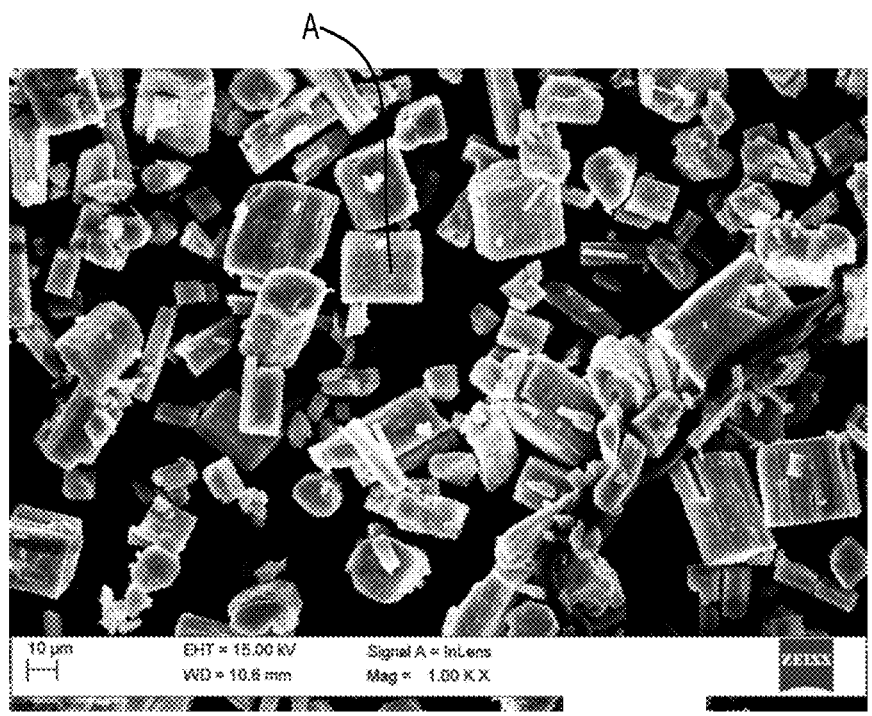
FIG. 10 is an image from a scanning electron microscope of $\beta$-$Li_3PS_4$ that is synthesized using a wet chemical process and heat treated, in accordance with one embodiment of the present disclosure.
Figure 11:
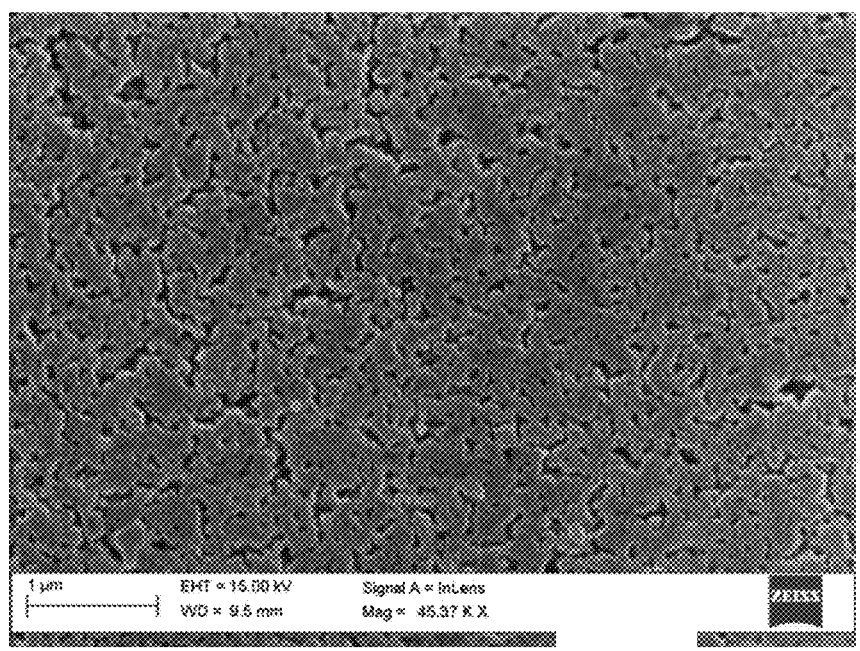
FIG. 11 is an enlarged image from section "A" of the $\beta$-$Li_3PS_4$ that is depicted in FIG. 10.

Images of the as-synthesized precipitate and the recrystallized $\beta$-Li$_3$PS$_4$ were taken with a field-emission scanning electron microscopy (SEM) (Zeiss Merlin®). FIG. 9 is an SEM image taken from as-synthesized precipitate of Li$_3$PS$_4$. FIG. 10 is an image from a scanning electron microscope of recrystallized $\beta$-Li$_3$PS$_4$. The heat-treated powder, i.e., recrystallized $\beta$-Li$_3$PS$_4$, inherits the morphology of the as-synthesized powder, i.e., as-synthesized precipitate of Li$_3$PS$_4$. The SEM images in FIGS. 9 and 10 exhibit a grain size of about 100 nm. FIG. 11 is an enlarged image from section "A" of the $\beta$-Li$_3$PS$_4$ that is depicted in FIG. 10. The enlarged image from section "A" of the $\beta$-Li$_3$PS$_4$ that is depicted in FIG. 11 exhibits nanoporous structure derived after the removal of solvent, i.e., tetrahydrofuran (THF).

Raman Spectroscopy and X-Ray Diffraction

The samples, i.e., the as-synthesized precipitate and the recrystallized $\beta$-Li$_3$PS$_4$, were characterized by X-ray diffraction (PANalytical Powder Diffractometer) and Raman spectroscopy (Princeton Instruments Acton Trivista 555). The inductively coupled plasma determined the Li/P ratio. Inductively coupled plasma spectroscopy determines the Li/P ratio, which is close to the stoichiometric Li/P ratio of 3:1 in Li$_3$PS$_4$.

Figure 12:
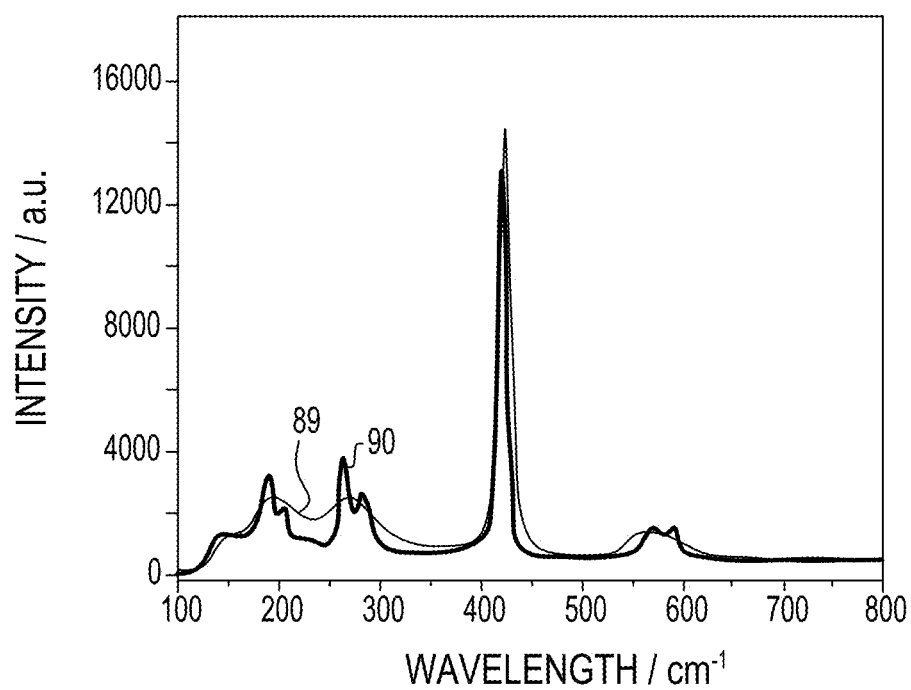
FIG. 12 is a plot of Raman spectroscopy of as-synthesized $\beta$-$Li_3PS_4$ and recrystallized $\beta$-$Li_3PS_4$, in accordance with one embodiment of the present disclosure.
Figure 13:
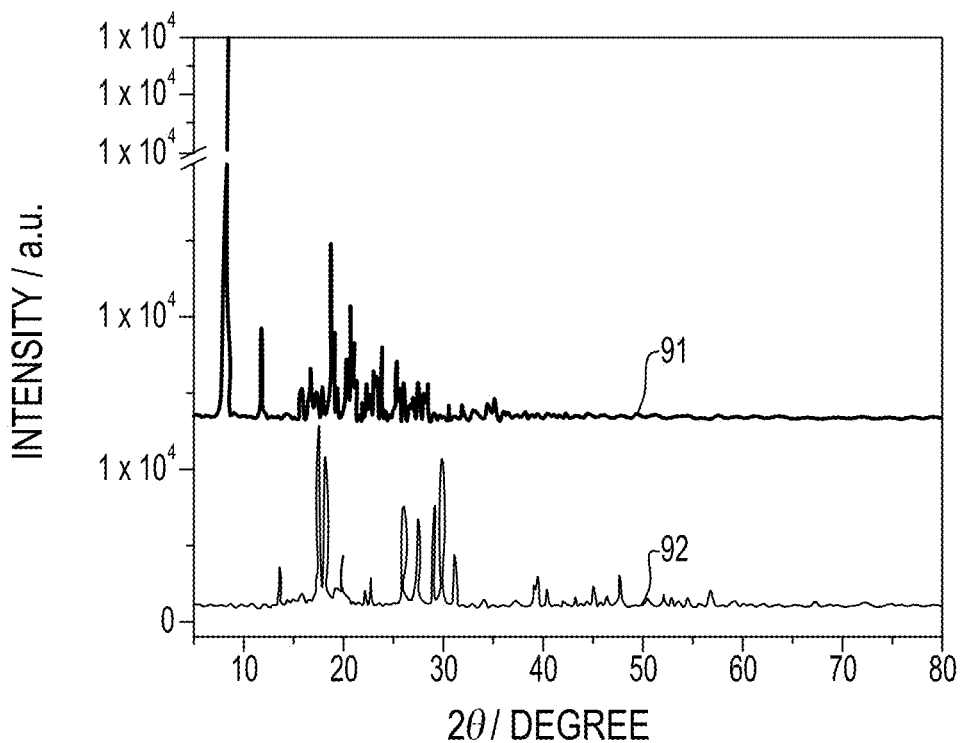
FIG. 13 depicts X-ray diffraction (XRD) patterns for recrystallized $\beta$-$Li_3PS_4$, and as synthesized samples of $Li_3PS_4$, in accordance with one embodiment of the present disclosure.

FIG. 12 is a plot of Raman spectroscopy for recrystallized $\beta$-Li$_3$PS$_4$, as indicated by plot 90, and as synthesized samples of Li$_3$PS$_4$, as indicated by plot 89. FIG. 13 depicts X-ray diffraction (XRD) patterns for recrystallized $\beta$-Li$_3$PS$_4$, as indicated by plot 92, and as synthesized samples of Li$_3$PS$_4$, as indicated by plot 91. Raman spectroscopy shows the characteristic peak of Li$_s$PS$_4$ at 422 cm$^{-1}$ for the as-synthesized samples, which is in good agreement with that for pure Li$_3$PS$_4$, as depicted in plot 89 of FIG. 13. The additional peaks at low wavelengths indicate the strong coordination of tetrahydrofuran (THF) with Li$_3$PS$_4$, which shows very different diffraction pattern, as depicted in plot 91 of FIG. 13. The as-synthesized powders were well crystallized with a strong diffraction peak at about 8.4° (2θ) and other diffraction peaks with significantly lower intensity, as illustrated by plot 91 of FIG. 13. Once the tetrahydrofuran (THF) is removed after heat treatment, the Raman spectroscopy agrees well with that for single crystal Li$_3$PS$_4$, as illustrated by plot 89 in FIG. 12.

X-ray diffraction data for the heat treated as-synthesized powders illustrated a significant decrease in intensity with the increase of the temperature for the heat treatment, which was accompanied with a significant weight loss due to the removal of tetrahydrofuran (THF) solvated with Li$_3$PS$_4$. At this stage, the as-synthesized crystal phase transfers to amorphous phase. Recrystallization of the amorphous phase occurs at above 120° C. Referring to plot 92 of FIG. 13, the X-ray diffraction pattern for the recrystallized, i.e., heat treated as synthesized Li$_3$PS$_4$, can be indexed to $\beta$-Li$_3$PS$_4$, which has an orthorhombic crystal structure having space group pnma.

Reitveld Refinement of X-Ray Diffraction of $\beta$-Li$_3$PS$_4$

Figure 14:
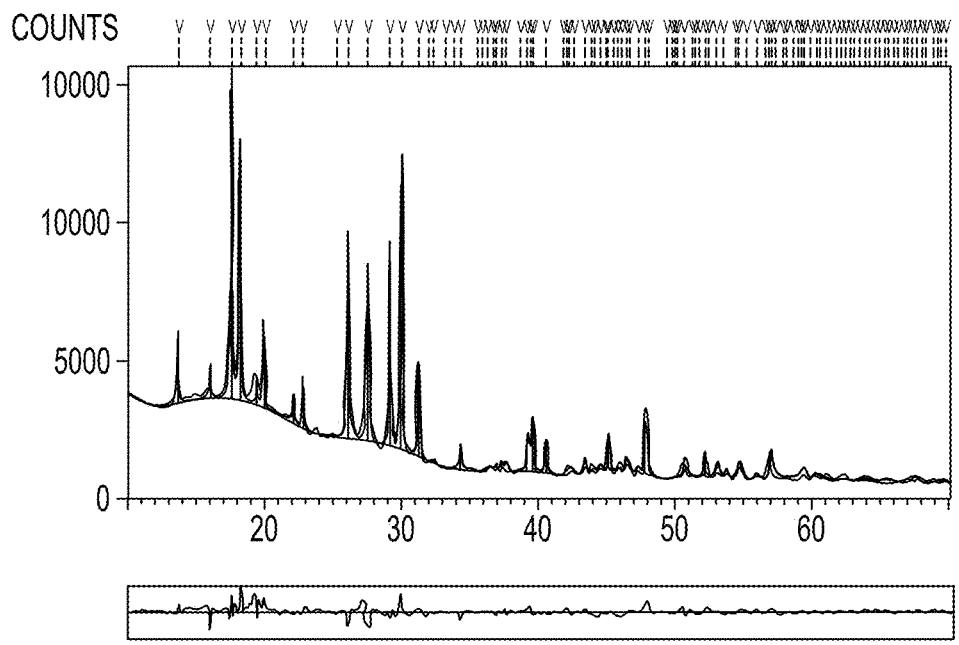
FIG. 14 depicts a Rietveld refinement of X-ray diffraction of recrystallized $\beta$-$Li_3PS_4$, in accordance with one embodiment of the present disclosure.
Figure 15:
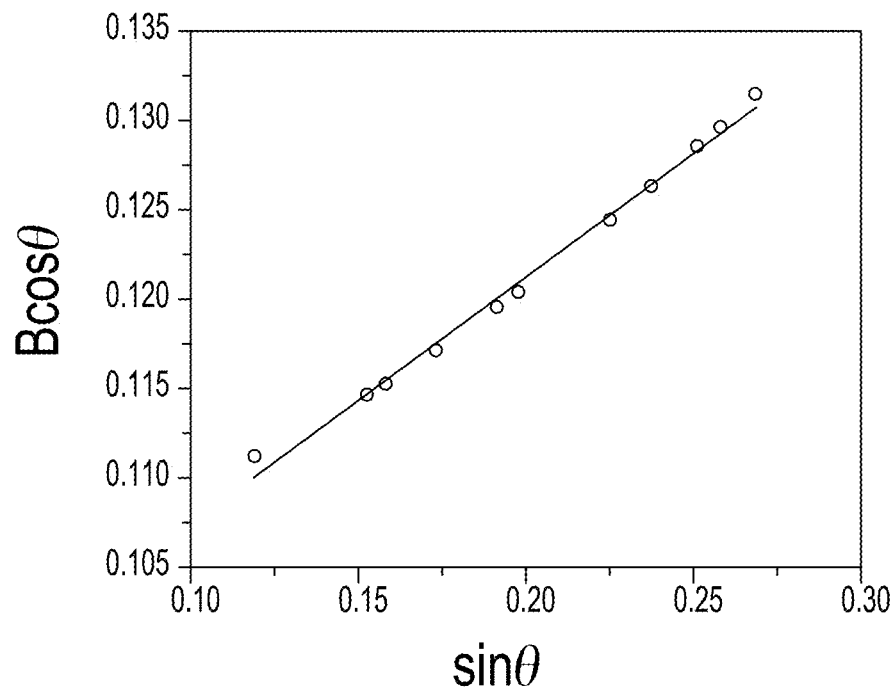
FIG. 15 is a Williamson Hall plot (B cos $\theta$ vs sin $\theta$) that is derived from Rietveld refinement depicted in FIG. 14.

FIG. 14 illustrates a Rietveld refinement of x-ray diffraction of recrystallized $\beta$-Li$_3$PS$_4$. The X-ray diffraction pattern can be indexed to the orthorhombic $\beta$-Li$_3$PS$_4$ (space group pnma, a=12.9857(8), b=8.0559(5), c=6.1380(3)). The Rietveld refinement analysis reveals that the peak broadening of the X-ray diffraction pattern that occurs when heat treating the as-synthesized precipitation of Li$_3$PS$_4$ to form the recrystallized $\beta$-Li$_3$PS$_4$ originates partially from micro-strain (~0.11%) that is induced in the Li$_3$PS$_4$ after solvent removal, i.e., removal of the tetrahydrofuran (THF). FIG. 15 is a Williamson Hall plot (B cos θ vs sin θ) that is derived from Rietveld refinement depicted in FIG. 14. The linear dependence of B cos θ on sin θ in the Williamson Hall plot confirm the existence of micro strain. Size and strain analysis gives the grain size of 92 nm, which is larger than that (~73 nm) obtained from size-only analysis. The size and strain data for the recrystallized $\beta$-Li$_3$PS$_4$ provided using the Rietveld refinement was consistent with the grain size determined from the scanning electron microscopy (SEM) images for the recrystallized $\beta$-Li$_3$PS$_4$ depicted in FIG. 10, in which the recrystallized $\beta$-Li$_3$PS$_4$ exhibited a grain size of about 100 nm.

Figure 16:
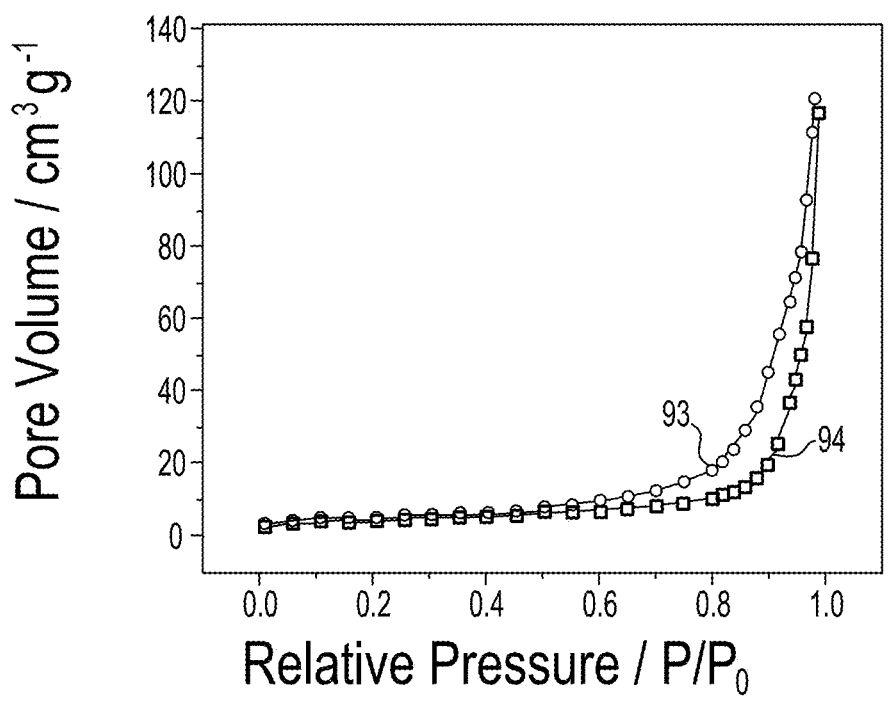
FIGS. 16 and 17 illustrate Brunauer-Emmett-Teller (BET) characterization of recrystallized $\beta$-$Li_3PS_4$, in accordance with one embodiment of the present disclosure.
Figure 17:
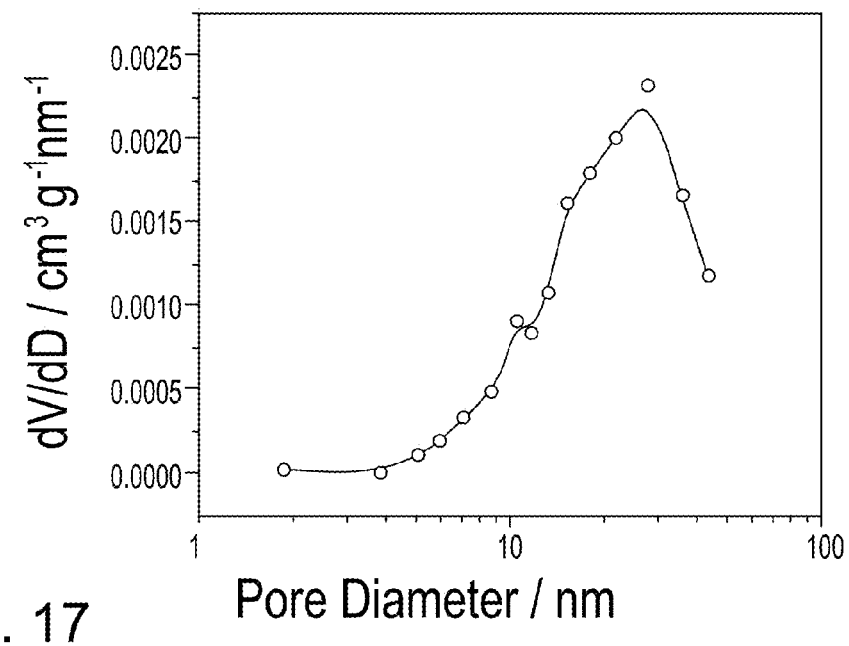

Brunauer-Emmett-Teller (BET) and Small Angle X-Ray Diffraction Characterization of $\beta$-Li$_3$PS$_4$ FIGS. 16 and 17 illustrate Brunauer-Emmett-Teller (BET) characterization of recrystallized $\beta$-Li$_3$PS$_4$. Plot 93 in FIG. 16 is a plot of N$_2$ desorption isotherms at a temperature of 77° K, and plot 94 is a plot of N$_2$ adsorption isotherms at a temperature of 77° K. N$_2$ adsorption/desorption isotherms were measure using a Micromeritic Gemini 275 system. The specific surface areas was calculated using the Brunauer-Emmett-Teller (BET) theory based on the adsorption branches of the isotherms. The high surface area of 15.6 m$^2$g$^{-1}$ indicates the nanoporous structure of recrystallized $\beta$-Li$_3$PS$_4$.

FIG. 17 is a plot of the pore size distribution that was calculated by using adsorption isotherm. The pore size distributions were calculated by using Barrett-Joyner-Halenda (BJH) method based on the adsorption branches of the isotherms. The average pore size of 28 nm depicted in FIG. 17 was consistent with that 33 nm measurement that was obtained from small angle X-ray diffraction measurement.

The as-synthesized precipitate of Li$_3$PS$_4$ did not show any detectable surface area, while the heat-treated recrystallized $\beta$-Li$_3$PS$_4$ samples provide a high BET surface area of 15.6 m$^2$g$^{-1}$, as depicted in FIG. 16. Considering the grain size of about 100 nm, the high surface area indicated that the recrystallized $\beta$-Li$_3$PS$_4$ had a porous structure with the average pore size of 28 nm. The porous structure and micro-strain created by solvent removal, e.g., removal of tetrahydrofuran (THF), generates a large number of lattice defects, which can cause a charge imbalance. The smaller the grain size (nanocrystalline vs micro), the higher the surface energy of the system. The increased surface energy may induce chemical lattice distortion, which in turn lowers the phase transition temperature. The stabilization of β-Li$_3$PS$_4$ at room temperature can be attributed to the increased surface energy and the resulted charge imbalance.

Figure 18:
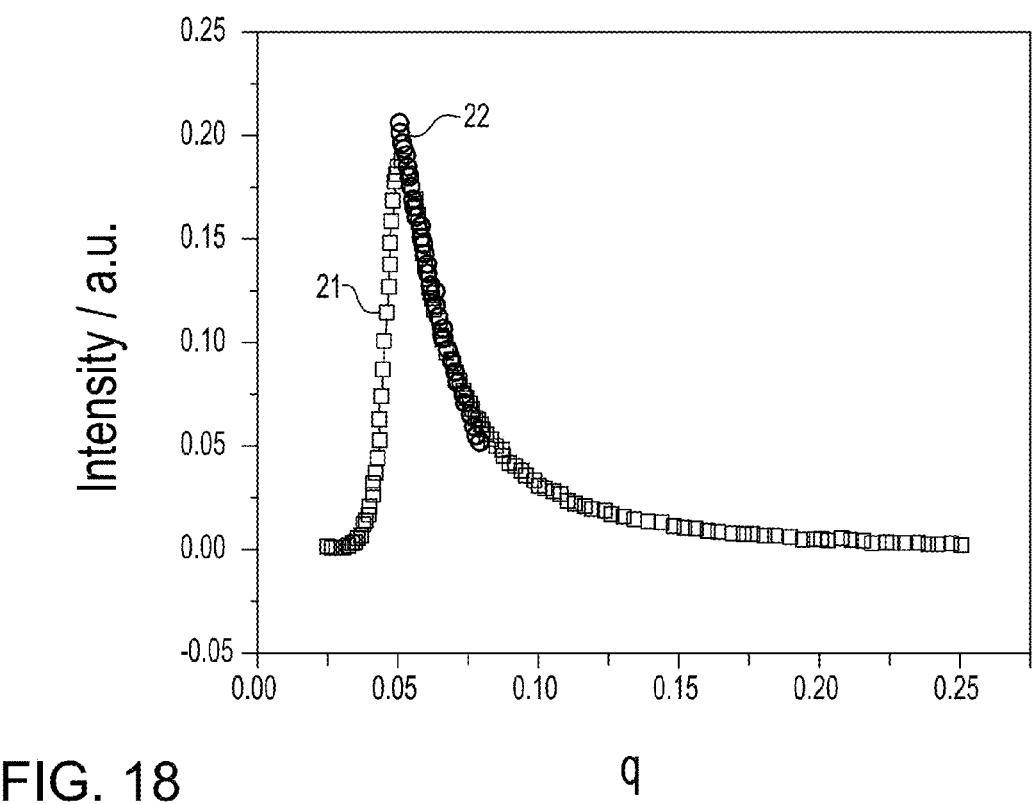
FIG. 18 is a plot of small angle X-ray scattering of recrystallized $\beta$-$Li_3PS_4$, in accordance with one embodiment of the present disclosure.

FIG. 18 is a plot of small angle x-ray scattering data that was collected using an Anton-Paar SAXSess instrument with Cu Kα radiation in line mode. The sample of recrystallized β-Li$_3$PS$_4$ was placed into a past cell and data was collected with a CDD operating in 1-dimensional mode. The data was treated with background subtraction, dark current substrate, desmearing and Guinier analysis. The plot identified by reference number 21 is the experimental data. The plot identified by reference number 22 is the Guinier fitting. The small angle x-ray scattering data indicated that the pore size was of the recrystallized β-Li$_3$PS$_4$ sample was approximately 33 nm.

Ion Conductivity of β-Li$_3$PS$_4$

Figure 19:
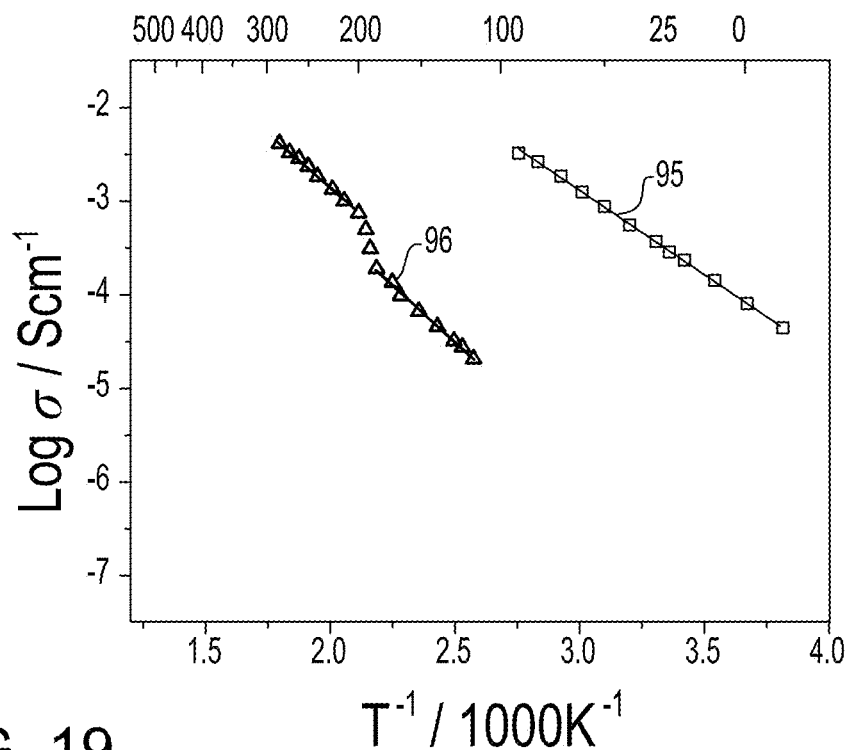
FIG. 19 is a temperature dependent Arrhenius plot of lithium ionic conductivity taken from recrystallized $\beta$-$Li_3PS_4$ pellets, in accordance with one embodiment of the present disclosure.
Figure 20:
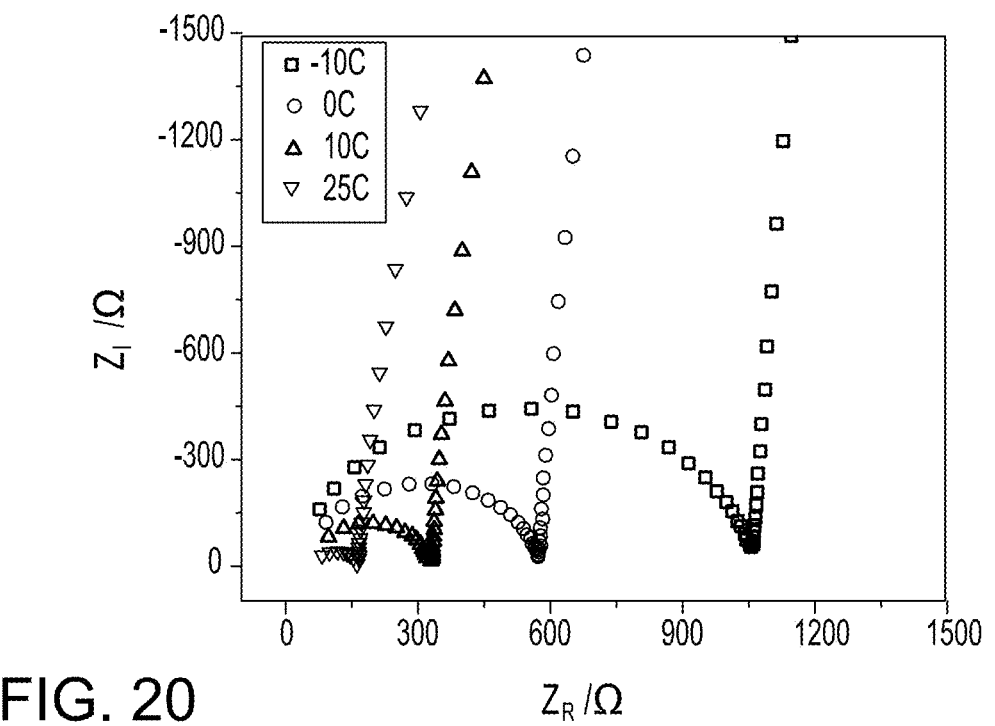
FIGS. 20 and 21 depict the impedance spectrum measured from recrystallized $\beta$-$Li_3PS_4$ pellets across temperatures ranging from −10° C. to 90° C., in accordance with one embodiment of the present disclosure.
Figure 21:
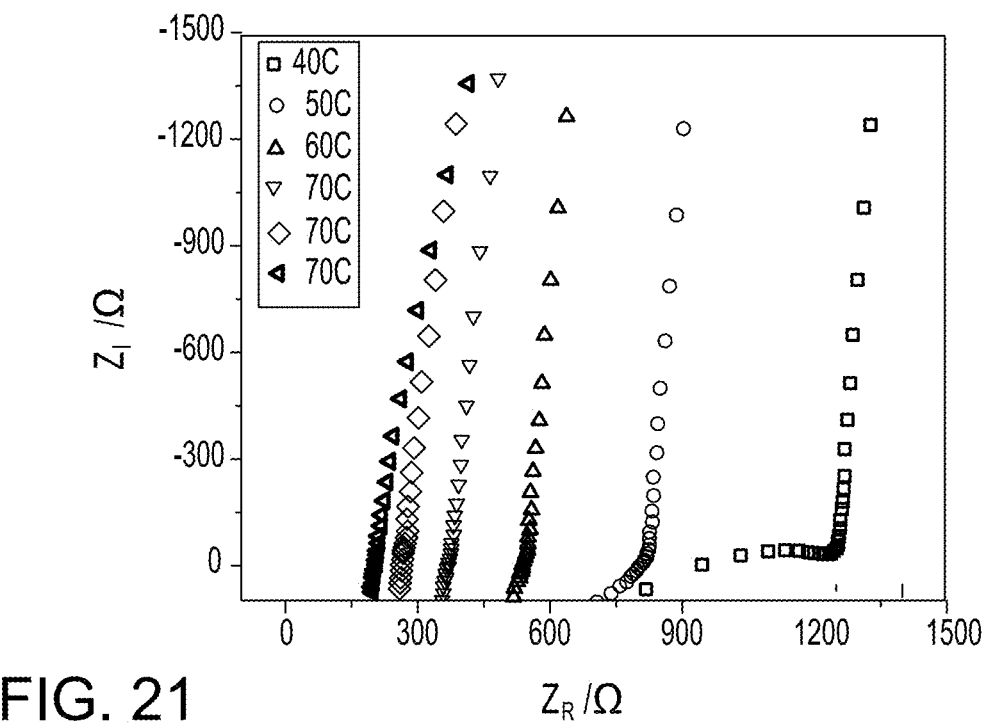

FIGS. 19-21 illustrate the lithium ionic conductivity of recrystallized β-Li$_3$PS$_4$ pellets that are formed in accordance with the procedures described above in the section of this paper titled "preparation of test samples". FIG. 19 is temperature dependent Arrhenius plot. FIGS. 20 and 21 depict the impedance spectrum for Li$_3$PS$_4$ measured from recrystallized β-Li$_3$PS$_4$ pellets. The total conductivity is determined by using the intersection between the semiarc and straight line as the total resistance. The continuous linear relationship between the conductivity (log) and the reciprocal of absolute temperature (1/T) indicates that no phase transition occurs between −10° C. and 90° C. Plot 95 of FIG. 19 is a plot of the ionic conductivity for heat treated samples, i.e., recrystallized β-Li$_3$PS$_4$ pellets, which were formed using a low temperature wet chemical synthesis method. Plot 96 of FIG. 19 is a plot of the ionic conductivity of a comparative sample of β-Li$_3$PS$_4$ that was formed using a high temperature sintering method that was followed with quenching. Prior to the wet chemical synthesis methods disclosed herein, it was believed that β-Li$_3$PS$_4$ could only exist at a high temperature of above 200° C., and would transfer to γ-Li$_3$PS$_4$ below 200° C., which is a poor ionic conductor at room temperature. Further, it was determined that β-Li$_3$PS$_4$ formed using sintering and quench methods exhibit an irreversible phase transformation at 70° C. Referring to FIG. 19, the ionic conductivity of the recrystallized β-Li$_3$PS$_4$ pellets illustrated by plot 95 increases significantly to $2.9 \times 10^{-4}$ Scm$^{-1}$, which is 2 orders of magnitude higher than the ionic conductivity of a comparative sample illustrated by plot 96 that was prepared from a solid state method, when extrapolated to 25° C. Further, the ionic conductivity of the recrystallized β-Li$_3$PS$_4$ pellets was 3 orders of magnitude higher than γ-Li$_3$PS$_4$ at room temperature. The recrystallized β-Li$_3$PS$_4$ pellets had an activation energy of 0.356 eV.

Pellets of as-synthesized β-Li$_3$PS$_4$, i.e., not heat treated β-Li$_3$PS$_4$, were also tested for ionic conductivity. The pellets of as-synthesized β-Li$_3$PS$_4$ had large amounts of THF (about 50 wt. %), and exhibited an ionic conductivity of only $1.7 \times 10^{-9}$ Scm$^{-1}$. This indicated that the tetrahydrofuran (THF) is strongly bonded with lithium ions as evidenced by the different Raman spectrum and XRD pattern from those of heat-treated samples, as depicted in FIGS. 12 and 13. In some examples, the tetrahydrofuran (THF) impedes the lithium ionic mobility, thus presenting very poor ionic conductivity. The amorphous phases of Li$_3$PS$_4$ show improved ionic conductivities, but undergoes crystallization during the impedance measurement at higher temperatures.

Cyclic Voltammogram of Battery Cell Including Solid Electrolyte of Li$_3$PS$_4$

Figure 22:
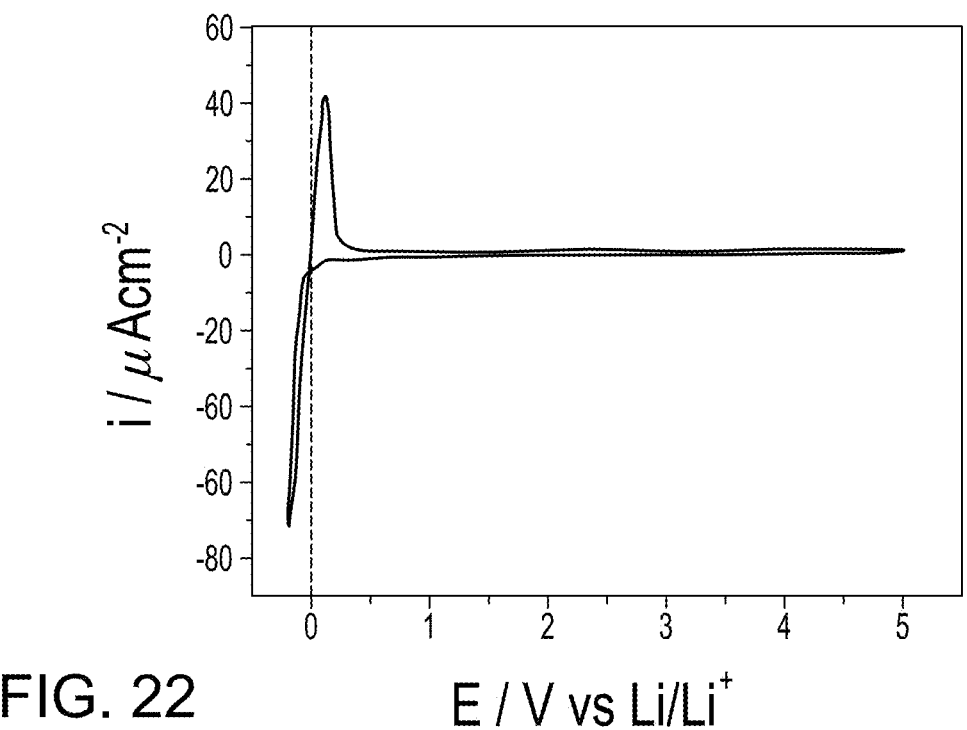
FIG. 22 is a cyclic voltammogram measured from a Li/$Li_3PS_4$/Pt cell, in accordance with one embodiment of the present disclosure.

FIG. 22 is a cyclic voltammogram that was measured from a Li/Li$_3$PS$_4$/Pt cell at a scan rate of 100 mVs$^{-1}$ between −0.2 V and 5 V at room temperature (20° C. to 25° C.) by using a potentiostat (EG&G). The lithium (Li) and platinum (Pt) serve as reference and working electrodes, respectively. The Li/Li$_3$PS$_4$/Li symmetric cell was tested on Maccor battery testing station with the current of 0.1 mAcm$^{-2}$ at room temperature (20° C. to 25° C.) and with the current of 0.5 mAcm$^{-2}$ at 80° C. No significant currents except for the lithium deposition and dissolution near 0V were observed, indicating that β-Li$_3$PS$_4$ is stable against lithium and the decomposition potential of β-Li$_3$PS$_4$ exceeds 5 V. The cathodic current corresponding to lithium deposition increases significantly below 0 V, and the anodic current due to lithium dissolution is limited to 0.22V. Significant current was not present in the potential range of 0.22 V to 5 V. The electrical performance depicted in FIG. 22 indicates that almost no side reactions (electrolyte decomposition etc.) occur in the Li/Li$_3$PS$_4$/Pt cell, and that β-Li$_3$PS$_4$ is quite compatible with lithium electrode.

While the present disclosure has been particularly shown and described with respect to preferred embodiments thereof, it will be understood by those skilled in the art that the foregoing and other changes in forms and details can be made without departing from the spirit and scope of the present disclosure. It is therefore intended that the present disclosure not be limited to the exact forms and details described and illustrated, but fall within the scope of the appended claims.

What is claimed is:

1. A method of forming a composite core shell material comprising:
    forming a first mixture including a solid component of a first portion of lithium sulfide (Li$_2$S) and diphosphorus pentasulfide (P$_2$S$_5$) in a ratio ranging from 0.75:1 to 1.25:1 with a liquid solvent comprising carbon and hydrogen to form a first shell of the composite core shell material, wherein the core of the composite core shell material is comprised of lithium sulfide (Li$_2$S) and the first shell of the composite core shell material is comprised of Li$_4$P$_2$S$_7$;
    forming a second mixture of a second portion of lithium sulfide and carbon powder;
    combining the second mixture with the first mixture after the first shell of the composite core shell material is formed, wherein the combining of the first mixture with the second mixture provides at least one second shell that is comprised of Li$_4$P$_2$S$_7$ and carbon, wherein the at least one second shell is in contact with the first shell; and
    removing the liquid solvent.

2. The method of claim 1, wherein the first shell of the composite core shell material is free of carbon.

3. The method of claim 1, wherein the at least one second shell of the composite core shell material comprises 80 wt % to 95 wt % Li$_4$P$_2$S$_7$, and 5 wt % to 20 wt % carbon (C).

4. The method of claim 1, wherein the forming of the first mixture and the second mixture is at a temperature ranging from 20° C. to 140° C.

5. The method of claim 1, wherein forming the first mixture comprises dry milling of the lithium sulfide (Li$_2$S) and diphosphorus pentasulfide (P$_2$S$_5$) followed by mechanical mixing with the solvent comprising carbon and hydrogen.

6. The method of claim 1, wherein the solvent is selected from the group consisting of acetone, dichloromethane (DCM), tetrahydrofuran (THF), ethyl acetate, dimethylformamide (DMF), acetonitrile (MeCN), dimethyl sulfoxide (DMSO), dimethoxyethane (DME) and a combination thereof.

7. The method of claim 1, wherein the forming of the second mixture of the second portion of lithium sulfide and the carbon powder comprises dry milling to provide a homogenous mixture of lithium sulfide and carbon powder.

8. The method of claim 1, wherein the carbon powder comprises carbon black, porous carbon, activated carbon, single layer graphene molecules, multilayer graphene molecules, carbon fiber, carbon nanotubes or a combination thereof.

9. The method of claim 1, wherein the removing the liquid solvent comprises drying the second mixture at a temperature ranging from 20° C. to 250° C.

\* \* \* \* \*